United States Patent
Ozdemir et al.

(10) Patent No.: US 10,228,932 B2
(45) Date of Patent: Mar. 12, 2019

(54) UPGRADE VERIFICATION TOOL

(71) Applicant: Oracle International Corporation, Redwood Shores, CA (US)

(72) Inventors: Ozer Ozdemir, Redmond, WA (US); Tevfik Sinan Ingec, Redmond, WA (US); Tufan Erdinc, Redmond, WA (US); Arnab Roy, Bothell, WA (US); Mike Durran, Bristol (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/167,961

(22) Filed: May 27, 2016

(65) Prior Publication Data

US 2017/0192873 A1 Jul. 6, 2017

Related U.S. Application Data

(60) Provisional application No. 62/274,063, filed on Dec. 31, 2015.

(51) Int. Cl.
*G06F 9/44* (2018.01)
*G06F 8/658* (2018.01)
*G06F 8/71* (2018.01)

(52) U.S. Cl.
CPC ............... *G06F 8/658* (2018.02); *G06F 8/71* (2013.01)

(58) Field of Classification Search
CPC ..................................................... G06F 8/658
(Continued)

(56) References Cited

U.S. PATENT DOCUMENTS 6,889,337 B1 * 5/2005 Yee ..................... G06F 11/3688
434/116
8,271,232 B1 * 9/2012 Roucis ................ G06F 17/5036
438/18
(Continued)

OTHER PUBLICATIONS

Ilia Kravets et al.; "Feasibility of Mutable Replay for Automated Regression Testing of Security Updates"; Downloaded circa May 27, 2016 http://www.dcs.gla.ac.uk/conferences/resolve12/papers/session4_paper2.pdf.
(Continued)

*Primary Examiner* — Wei Y Zhen
*Assistant Examiner* — Lanny N Ung
(74) *Attorney, Agent, or Firm* — Trellis IP Law Group, PC

(57) ABSTRACT

An example method facilitates verifying behaviors, functionality, and user interface display screens of a post-upgrade software system by comparing output thereof with a pre-upgrade software system. The example method includes accepting a first signal from a user input device to identify, at least in part, a first set of pre-upgrade output data items from the pre-upgrade software system; accepting a second signal from a user input device to identify, at least in part, a second set of corresponding post-upgrade output data items from the post-upgrade software system; and performing a consistency validation check between corresponding output data items in the first set and the second set. Accordingly, output data items in an upgraded system are readily validated against a pre-upgrade system. Plugins, as part of an upgrade verification tool, may implement specific tests. This enables enterprise software customers to automate their on-premise upgrade validation processes and to choose tests.

20 Claims, 12 Drawing Sheets

(58) Field of Classification Search
USPC .......................................................... 717/126
See application file for complete search history.

(56) References Cited

U.S. PATENT DOCUMENTS

2015/0082280 A1\* 3/2015 Betak .................. G06F 11/3692
717/124
2015/0339215 A1\* 11/2015 Liao .................... G06F 11/3624
717/125

OTHER PUBLICATIONS

"BI Forum 2015 Preview—OBIEE Regression Testing and Data Discovery with the ELK stack"; Apr. 24, 2015; http://www.rittmanmead.com/2015/04/bi-forum-2015-preview-obiee-regression-testing-and-data-discovery-with-the-elk-stack/.

\* cited by examiner

☐ Comparison Report, Catalog Report — ☐ ✕

File  Edit  Format  View  Help

Report Name: Catalog Report.csv
Baseline Pivot/Verification Data: Total Count/22, Fail Count 0, Pass Count 22, Missing 0, New Item Count 0
1st Deployment Name: Pre-Upgrade, Server Name: http://xyz.com/9704/analytics
2nd Deployment Name: Post-upgrade, Server Name: http://xyz.com/9502/analytics

| Name | Link | Result | 1st Deployment | 2nd Deployment |
|---|---|---|---|---|
| Quarterly Revenue | Server | Pass | 1st Catalog, File Link | 2nd Catalog, File Link |
| Sales by Brand | Server | Pass | 1st Catalog, File Link | 2nd Catalog, File Link |
| Order Details | Server | Pass | 1st Catalog, File Link | 2nd Catalog, File Link |
| Timeline | Server | Pass | 1st Catalog, File Link | 2nd Catalog, File Link |
| Trellis | Server | Pass | 1st Catalog, File Link | 2nd Catalog, File Link |

FIG. 9

UPGRADE VERIFICATION TOOL

CROSS REFERENCES TO RELATED APPLICATIONS

This application claims priority from U.S. Provisional Patent Application Ser. No. 62/274,063, entitled UPGRADE VERIFICATION TOOL, filed on Dec. 31, 2015, which is hereby incorporated by reference as if set forth in full in this application for all purposes.

BACKGROUND

The present application relates to computing and more specifically to software and accompanying systems and methods for validating success of a software upgrade, patch, or build.

Software upgrade verification and validation methods (also called regression testing methods) are employed in various demanding applications, including during testing, developing, provisioning and using of cloud-based applications and services; testing mobile device software prior to deployment; validating whether a new update to a desktop operating system has succeeded, and so on. Such applications often demand efficient mechanisms for analyzing and verifying upgraded software behavior and data, including detecting software errors or undesirable changes (e.g., improperly displayed user interface display screens); validating software functionality that may result from software updates (e.g., patches) or upgrades; validating data and associated software functionality accessible to a given user after an upgrade, and so on.

In general, sometimes newly upgraded software features or functionality may interfere with prior or preexisting features or functionality. Regression testing may catch newly introduced errors or bugs in upgraded software.

Efficient methods and mechanisms for performing regression testing can be particularly important in enterprise applications, such as Business Intelligence (BI) enterprise applications that leverage associated enterprise cloud services, and where software updates may be particularly frequent and where errors can be particularly costly. Furthermore, costs associated with problematic upgrades can demotivate enterprise software upgrades, leaving many enterprises with potentially compromised legacy software. Problematic software errors or other regressions may occur in response to minor and major enterprise software upgrades or patches, including daily builds.

Conventionally, enterprise software developers, software testers, customers, and support agents may manually test upgraded software and report any newly detected errors or inconsistencies. However, manual testing can be prohibitively error prone, time consuming, and costly.

To enhance regression testing efficiency, regression testing software may be used. However, existing regression testing software typically lacks efficient mechanisms for accurately and consistently uncovering newly introduced issues or problems in upgraded software, especially for cloud-based enterprise software. Furthermore, such regression testing software can be complex and costly to build, maintain, and frequently revise to meet the needs of rapidly changing enterprise computing environments.

SUMMARY

An example method facilitates verifying behaviors, functionality, and user interface display screens of a post-upgrade software system by comparing output and/or catalogs thereof with a pre-upgrade software system. The example method includes accepting a first signal from a user input device to identify, at least in part, a first set of pre-upgrade output data items from the pre-upgrade software system; accepting a second signal from a user input device to identify, at least in part, a second set of corresponding post-upgrade output data items from the post-upgrade software system; gathering information characterizing the first set of pre-upgrade output data items and gathering information characterizing the second set of post-upgrade output data items from the first software system and the second software system, respectively, resulting in a set of gathered information; using the gathered information to perform a consistency validation check between corresponding output data items in the first set and the second set; and storing the results of at least a portion of the consistency validation check, yielding stored results in response thereto.

In a more specific embodiment, the pre-upgrade and post-upgrade software systems include respective software applications. The respective pre-upgrade and post-upgrade software applications may be deployed and running during near simultaneous initial testing of the pre-upgrade and post-upgrade software applications, i.e., during performing the consistency validation check.

In the specific embodiment, the pre-upgrade software application and the post-upgrade software application include networked enterprise software applications, such as cloud-based Business Intelligence (BI) software applications. The first set of pre-upgrade output data items may represent data objects of a first presentation catalog of the pre-upgrade software application. Similarly, the second set of corresponding post-upgrade output data items may include or represent data objects of a second presentation catalog of the post-upgrade software application.

The consistency validation check may further include analyzing the pre-upgrade output data items to produce a first set of test results; analyzing the post-upgrade output data items to produce a second test result; and comparing the first set of test results and the second set of test results in accordance with a predetermined comparison test, yielding comparison results. The predetermined comparison test may be implemented via a plugin that is specialized for that comparison test.

In the specific embodiment, the step of analyzing the post-upgrade output data items further includes analyzing the post-upgrade items near simultaneously with analyzing the pre-upgrade output data items. The step of performing the consistency validation check further includes employing one or more plugins to a controller of an upgrade validation tool to implement one or more respective comparison tests to generate the comparison results.

The predetermined test includes a first test that is specified via a control signal received from a user input device, e.g., as may be derived from a command line entry or selection of a user interface control. The first test may include, for example, a test of one or more user interface display screens and associated content used for the pre-upgrade software system and one or more user interface display screens and associated content used for the post-upgrade software system. The example predetermined test further includes a comparison test that is also indicated via the control signal. The comparison test involves collecting information that indicates differences between the first set of test results and the second set of test results.

The control signal may be generated from a command line entry that specifies one or more tests to perform as part of the consistency validation check. The one or more tests may be implemented via one or more corresponding plugins to a controller (also called plugin driver or host herein), wherein the one or more plugins are specialized for each of the one or more tests.

The step of accepting the first signal further includes receiving, at the controller, information (e.g., network address) characterizing the first set of pre-upgrade output data items as maintained in a configuration file, and accepting, at the controller, information characterizing a second set of post-upgrade output data items, as maintained in the configuration file. The example method further includes receiving a third signal at the controller, wherein the third signal represents a command to begin performing one or more consistency validation checks using on the pre-upgrade output data items and the post-upgrade output data items.

Note that various tests, including initial tests and comparison tests, may be implemented using one or more plugins to a controller. The controller may accept a fourth signal from a user input device to allow a user to choose from one or more predetermined sets of tests to be implemented via one or more respective plugins. Example plugins include a first plugin for generating a report score for a report, and then using the score to perform the consistency validation check between corresponding output data items in the first and second sets; a second plugin for generating a dashboard score for a dashboard visualization, and then using the score to perform the consistency validation check between corresponding output data items in the first and second sets.

The first and second plugins, and/or a third plugin may be configured to accept a signal from a user input device to allow a user to define a threshold which is used to adjust the sensitivity of at least one parameter of the validation check.

Additional software functionality that may be implemented via one or more plugins includes functionality for accepting a prompted link definition; and using the prompted link to perform, at least in part, a validation check of a user interface dashboard.

Note that use of a plugin model to implement various embodiments discussed herein may result in various benefits over existing state-of-the-art regression testing methods. In particular, use of the plugin model as discussed herein enables, at least in part, relatively easily managed small test areas; clearly defined system architectures; enhanced extensibility to accommodate new types of tests, new software applications and computing environments, etc. (e.g., the plugins facilitate adding functionality later without necessitating changes to the controller, i.e., plugin driver itself); relatively tight control over consistency of tested software applications; relatively low usage of computer memory resources, and so on.

Additional benefits may result from the simultaneous launching of initial tests against the pre and post-upgraded software applications. In particular, differences in comparison reports due to changing of underlying data used by the software applications is mitigated or eliminated.

Hence, various example methods and accompanying systems discussed wherein may enable efficient verification of updated software application user interfaces, logic, and other software behaviors, thereby enabling testers, developers, and enterprise software customers to find issues or problems with their updated or upgraded enterprise software.

Furthermore, the testing of individual data items or computing objects that represent output data items of presentation catalogs, as opposed to limiting testing strictly to software user interface flows and associated behaviors, additional insight (e.g., as to how an upgraded version of a software application differs from a pre-upgraded version) is readily accessible via one or more report files.

A further understanding of the nature and the advantages of particular embodiments disclosed herein may be realized by reference of the remaining portions of the specification and the attached drawings.

BRIEF DESCRIPTION OF THE DRAWINGS

FIG. 9 illustrates a sixth UI display screen showing example content of a report generated based on comparison results output by a catalog plugin of the upgrade verification tool of FIGS. 1-2.

DETAILED DESCRIPTION OF EMBODIMENTS

Figure 1:
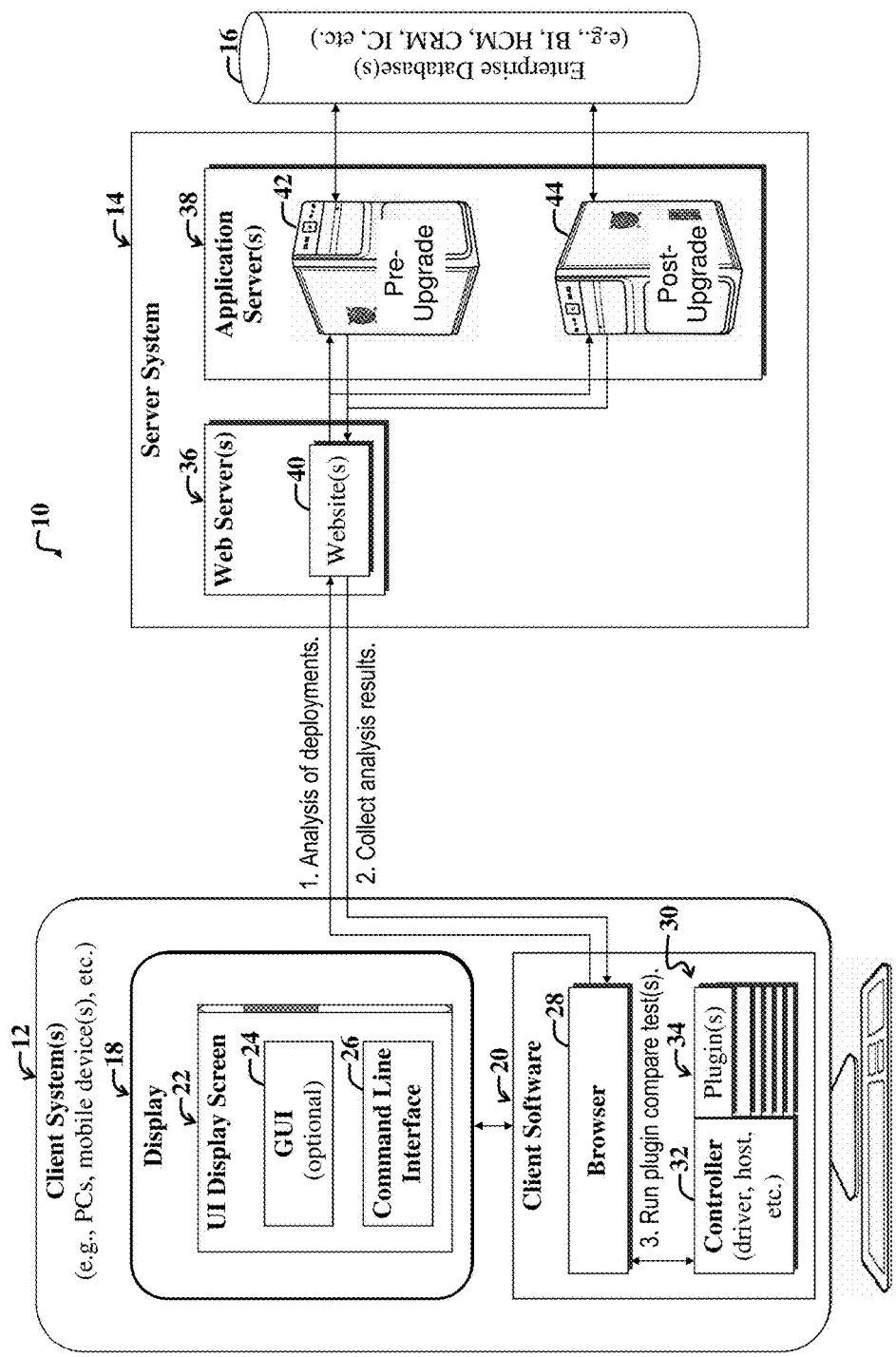
FIG. 1 illustrates a first example system and accompanying computing environment configured to enable testing of enterprise software in accordance with a first example embodiment.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

An enterprise computing environment may be any computing environment used for a business or organization. A computing environment may be any collection of computing resources used to perform one or more tasks involving computer processing. A computing resource may be any component, mechanism, or capability or quantities thereof of a computing environment, including, but not limited to, processors, memories, software applications, user input devices, and output devices, servers, and so on.

An example enterprise computing environment includes various computing resources distributed across a network and may further include private and shared content on Intranet Web servers, databases, files on local hard discs or file servers, email systems, document management systems, portals, and so on. The terms "computing system" and "computing environment" may be used interchangeably herein.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, and so on, of an enterprise. The terms "ERP software," "ERP application," and "enterprise software" may be employed interchangeably herein. However, an ERP application may include one or more ERP software modules or components, such as User Interface (UI) software modules or components. The term "software system" as used herein may include software applications and computing resources of a computing environment used to run the software.

Enterprise software applications, such as Customer Relationship Management (CRM), Business Intelligence (BI), and project management software, often include databases with various database objects, also called data objects or entities. For the purposes of the present discussion, a database object may be any computing object maintained by a database.

A computing object may be any collection of data and/or functionality. Examples of computing objects include a note, appointment, a particular interaction, a task, file, folder, database dimension, and so on. Examples of data that may be included in an object include text of a note (e.g., a description); subject, participants, time, and date, and so on, of an appointment; type, description, customer name, key performance indicators or other metrics, and so on, of an interaction; subject, due date, opportunity name associated with a task, and so on. An example of functionality that may be associated with or included in an object includes software functions or processes for issuing a reminder for an appointment.

For the purposes of the present discussion, software functionality may be any function, capability, or feature, e.g., stored or arranged data, that is provided via computer code, i.e., software. Generally, software functionality may be accessible via use of a UI and accompanying UI controls and features. Software functionality may include actions, such as retrieving data pertaining to a computing object (e.g., business object); performing an enterprise-related task, such as scheduling a meeting, promoting, hiring, and firing enterprise personnel, placing orders, calculating analytics, launching certain dialog boxes, performing searches, and so on.

Enterprise Business Intelligence (BI) systems can include large sets of software applications, modules, libraries, utilities, customized code or modifications, and other software components. These systems can allow users, companies or other entities (i.e., "customers") to generate large amounts of work product or other output data items such as reports, visualizations, web pages, etc. When a Business Intelligence (BI) system, or other software system, is "patched" or otherwise upgraded or changed, then the output data items generated by the upgraded system can also change in undesirable ways.

Certain embodiments discussed herein allow validation of the output data items in an upgraded system against the prior, or pre-upgraded, system. Upgrade consistency validation may be performed through dynamically loaded test components, e.g., plugins, as part of an upgrade verification tool. This helps software and cloud services customers, testers, developers, etc., to automate upgrade validation of their software, including on-premise software or distributed software, e.g., networked software applications leveraging cloud services.

For the purpose of the present discussion, a second software application is said to be an upgraded version (i.e., post-upgrade system) of a first software application (pre-upgrade system) if the first software application and/or associated software functionality has been modified (updated, patched, enhanced with a daily build, customized, replaced, etc.) to yield the second software application. Hence, an updated version of a software application and/or accompanying system may include any modified version or modified instance of a first software application or service.

A software regression may be any difference between a post-upgrade software application and a pre-upgrade software application. Examples of regressions include bugs that makes features malfunction after a software upgrade, patching, computing resource change, etc.; performance regressions representing reductions in software performance (e.g., runs more slowly, uses more memory or other system resources, etc., than prior versions).

Note that regressions may include, but are not limited to, changes resulting from using different computing hardware and other resources to deploy the upgrade software application as compared with the pre-upgrade software application. Accordingly, in the context of certain implementations of embodiments, the term "upgrade" may also refer to the upgrading or changing of computer hardware, e.g., as may occur during software application migration or re-deployment.

Similarly, the term "upgrade validation" (also called upgrade verification or baseline validation) may refer to any process that involves comparing the functioning and behaviors (i.e., software functionality) of a post-upgrade software application (and/or accompanying computing resources) with that of a pre-upgrade software application (and/or accompanying computing resources).

Note that a common and reoccurring problem when upgrading BI software applications includes the introduction of regressions, not only on major upgrades, but also on minor version upgrades, patches, or even daily builds.

Certain embodiments discussed herein include mechanisms and methods for comparing the output of reports on a software application before and after the version upgrades. While the upgrade verification tools discussed herein may be used as post-operation validation tools, embodiments are not limited thereto. Nevertheless, BI software application users and customers may readily employ embodiments discussed herein to uncover issues with their comparison reports quickly, enabling them to quickly react to any failing reports and/or associated functionality changes.

In general, embodiments of an upgrade verification tool discussed more fully below may be used by various persons, including testers, developers, support agents, and customers. Testers may use the tool to validate the functional consistency of the reports on upgrade testing and internal validation testing. Customers to use the upgrade verification tool in their testing and staging computing environments that they use for their upgrade purposes. Developers may use the tool to verify that bug fixes and new implementation do not introduce regressions to existing functionality. Support agents and customers may use the tool to verify that a patch or an upgrade has not caused any new regressions on a customer test or staging environment.

The upgrade verification tool may meet several objectives for a given implementation. Example objectives include: the tool should support both the UI and the command line execution; the tool should not require execution on any of the BI servers, and it should support remote execution; the tool should support in-place and out-of-place upgrades; the tool should keep an internal state and when it is executed, it should remember the last state it was left at; the user should be able to run the tests multiple times; the tool should be flexible enough to address various deployment configurations; the users should be able to select what actions to execute; the tool should be able to compare results run before and after the upgrade; an engineering team should be able to easily implement new actions on the tool, and so on.

For clarity, certain well-known components, such as hard drives, processors, operating systems, power supplies, routers, the Internet, administration servers, server cluster controllers, process schedulers, virtual machines, database management systems, mobile device managers, synchronization engines, Application Programming Interfaces (APIs), web services, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment configured to enable testing of enterprise software 42, 44 in accordance with a first example embodiment. The system 10 includes a client computer 12 in communication with a server system 14 via a network, such as the Internet.

For the purposes of the present discussion, a server may be any computing resource, such as a computer and/or software that is adapted to provide content, e.g., data and/or functionality, to another computing resource or entity that requests it, i.e., the client. A server system may be any collection of one or more servers.

A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

The example client computer (also called client system) 12, which may include a desktop computer, mobile computing device, and/or other type of computer, includes client software 20 that facilitates communicating with the server system 14 and use of a client-side display 18 for presenting various types of UI display screens, such as an optional Graphical User Interface (GUI) 24 and a command line interface 26.

For the purposes of the present discussion, a command line interface may be any mechanism or collection of mechanisms that facilitate user interaction with a software program by accepting commands via entered lines of text and/or other characters, called command lines. For example, the command line interface 26 may include a DOS or UNIX command line prompt that may accept user commands and associated arguments and then use the specific commands and arguments as input to software modules that the user wishes to control or otherwise use.

In the present example embodiment, the client software 20 includes a browser 28 and a client-side upgrade verification tool 30. The upgrade verification tool 30 supports regression testing of different software applications and/or instances, e.g., testing of a post-upgrade software application 44 and pre-upgrade software application 42. Note that certain embodiments discussed herein may also support testing of hardware resources, not just software algorithms, used to run the software applications 42, 44.

The upgrade verification tool 30 (also called the Upgrade Validation Tool (UVT) or the Baseline Validation Tool (BVT)), includes a controller (also called a plugin host or driver), which facilitates interfacing and selectively running plugins 34 in accordance with computing environment configuration information and input commands, e.g., as provided by the user via the UI display screen 22 and associated input devices.

The upgrade verification tool 30 may employ a browser 28 to communicate with the server system 14. The example server system 14 includes one or more web servers 36 hosting enterprise websites 40 and accompanying webpage code, which provide user interfaces for facilitating user interaction with underlying software functionality supported by one or more application servers 38. Webpage code used by the websites 40 may employ one or more services and/or APIs to communicate with the application servers 38 and accompanying pre-upgrade software application 42 and post-upgrade software application 44.

In the present example embodiment, the pre-upgrade software application 42 and the post-upgrade software application 44 communicate with one or more backend databases 16, e.g., by using known database connectivity mechanisms, which may include OnLine Analytical Processing (OLAP) techniques and interfaces.

Note that various modules of the system 10 may be grouped, arranged, coupled, and/or distributed differently than shown, without departing from the scope of the present teachings. For example, in an alternative grouping, the enterprise databases 44 may be considered as part of the server system 14. Similarly, some software functionality provided by the server system 14 and enterprise databases 44 may be offloaded to the client device 12. In other embodiments, the pre-upgrade and post-upgrade software applications 42, 44 may run on the client system 12 as opposed to servers of the server system 14. Similarly, in certain implementations, interconnections between modules may be different than those shown.

In operation, a user (e.g., tester, developer, software/ services customer, etc.) of the client device 12 prepares to perform regression testing using two software application deployments, i.e., the pre-upgrade software application 42 and the post upgrade software application 44.

The user employs the client software 20 to edit a configuration file. The configuration file includes information for identifying, locating, and facilitating access to data and functionality (by the upgrade verification tool 30) that is provided by the server-side software applications 42, 44 to be tested. The configuration file may be an eXtensible Markup Language (XML) or other suitable file type. Note that in certain implementations, the configuration file may be automatically be constructed by the upgrade verification tool 30, e.g., in response to user input from the optional GUI 24. The configuration file is accessible to the controller 32 and associated plugins 34 of the upgrade verification tool 30.

In the present example scenario, the user employs the command line interface 26 to direct the upgrade verification tool 30 to run particular tests, where each particular test may be performed largely by one or more of the plugins 34 that are specialized for the particular test. The particular tests to run may be specified via command line arguments. Alternatively, the user employs UI controls and associated user options and functionality of the GUI 24 to facilitate issuing commands to the upgrade verification tool 30 via the controller 32 thereof.

To conduct a particular test, the controller 32 references received command line input or other control signal input and computing environment configuration information to launch an analysis of the pre-upgrade and post-upgrade software application deployments 42, 44. The analysis may represent a discovery operation to discover characteristics of data and interfaces used by the pre-upgrade and post-upgrade software applications 42, 44.

The analysis may include, for example, accessing presentation catalogs of enterprise BI software applications 42, 44 and inputting specific parameters to catalog objects. The exact parameters are implementation specific and may vary depending upon which type of test is being conducted and other factors (e.g., user selections), as discussed more fully below.

Accordingly, each of the plugins 34 may perform a different type of analysis or otherwise perform a different type of operation on analysis results obtained from other plugins. Note that the controller 32 may support use of other plugins that are not necessarily involved in conducting specialized regression tests.

After initial analysis of characteristics, features, and/or functionality of the pre-upgrade and post upgrade software applications 42, 44, results (represented by initial test reports) of the initial analysis may be stored as initial test reports. The initial test reports may be stored in a log library as readily readable files, e.g., HyperText Markup Language (HTML), Excel Spreadsheet files (CSV), XML, or other format suitable for a given implementation.

Note that initial tests of the pre-upgrade software application 42 and the post-upgrade software application 44 may occur near simultaneously, e.g., so as to reduce potentially problematic variations resulting from changing underlying data (as maintained in the enterprise databases 16). The exact times for starting particular tests may be user-configurable, e.g., via command line entries and/or setting specified via the GUI 24.

The initial results of the analysis may be incorporated into initial test reports that are accessible to other plugins 34, e.g., a report-analysis and generation plugin. The initial reports may be accessible directly by the plugins 34, and/or via the controller 32, which may act as an interface between the plugins 34, log files and accompanying reports, configuration files, and so on.

In the present example scenario, after the different software application deployments 42, 44 are analyzed, and initial reports are constructed, the next phase of testing begins. The next phase of testing involves using compare modules of selected plugins 34 (e.g., as selected by command line input) to perform compare operations that compare initial reports associated with the pre-upgrade software application 42 with initial reports associated with the post-upgrade software application 44. The initial reports represent collected analysis results.

Each of the plugins 34 may include compare modules, e.g., functions or procedures that include computer code for determining differences or degrees of differences between data, features, or functionality of the deployments 42, 44. Note that certain plugins 34 and associated tests may allow for user-specification of similarity thresholds used to determine if a particular difference in data, features, or functionality between deployments 42, 44 represent a pass (i.e., validated) or non-pass (i.e., not validated) condition.

Hence, in the present example embodiment, when the upgrade verification tool 30 (i.e., Baseline Validation Tool (BVT)) runs, the tool 30 drives or otherwise controls the browser 28, thereby using the browser to access a specified website and execute any applicable actions for a given test, as indicated configuration information and any control signals (e.g., command line arguments, captured prompts, etc.).

The upgrade verification tool 30 controller 32 may act as a driver or host. The host 32 selectively calls functionality provided by the plugins 34 to runs tests; collects test results; and then later compares the results, yielding comparison results. The comparison results may be stored in a file that is readily viewable by the user, i.e., in a popular readily accessible file format (e.g., PDF, XML, HTML, CSV, etc.).

In general, the upgrade verification tool 30 may be implemented as a command line utility for enabling users to perform regression testing using BI software application presentation catalogs from any two compatible BI software applications. The tool 30 may extract catalog data from each system 42, 44 and generate comparison files. A comparison analysis of the files is then conducted to determine whether any changes/differences and/or errors exist. The tool 30 may support testing both in-place and out-of-place (e.g., remote) upgrades of software applications and/or underlying computing resources (which may include hardware resources).

Note that parallel execution of the initial analysis of deployments and collection of analysis results may yield benefits. In particular, underlying data can change during a test, resulting in different results due to changes in the underlying data source. Even if the deployment uses a static read-only data source, reports may still differ; merely due to different execute times. Simultaneous or near simultaneous execution of the initial deployment analysis may minimizes differences appearing in reports, where the differences are based primarily upon different execute times.

In general, the plugins 34 will complete specific tests; log files, e.g., test results and reports; compare results from to different test runs to facilitate identifying any differences in results of the two test runs; and so on. Plugin comparer modules may vary among modules, which may have different requirements as to what business logic is to be used for the comparison operations. Each plugin 34 may implement an interface that accepts at least two well-defined logs, e.g., a log with initial test results from a first pre-upgrade system and a log with initial test results from a second post-upgrade system.

Figure 2:
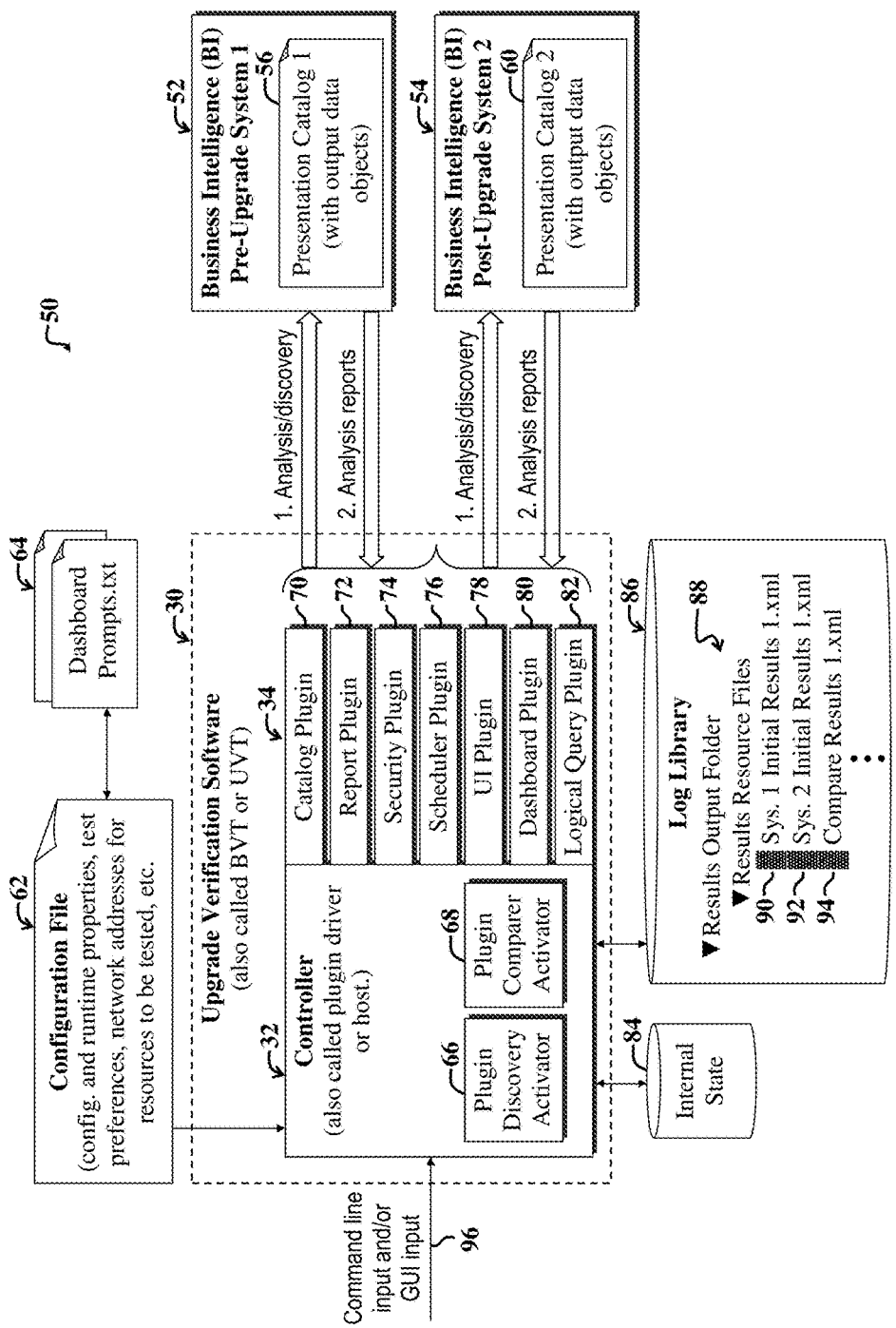
FIG. 2 illustrates additional detail of a second example system 50 that may be used with first example system of FIG. 1 and accompanying upgrade verification tool.

FIG. 2 illustrates additional detail of a second example system 50 that may be used with first example system 10 of FIG. 1 and accompanying upgrade verification tool 30. The second example system 50 includes the upgrade verification tool, i.e., software 30.

The upgrade verification tool 30 receives a configuration file 62 and associated auxiliary data 64 as input. Note that the configuration file 62 may include specifications of runtime properties associated with a first example BI pre-upgrade system 52 and a second example BI post-upgrade system 54. The configuration file 62 may further specify user test preferences, network addresses for resources 52, 54 to be tested, and so on.

The configuration file 62 may be an XML, HTML, or other file. The file may be linked to other files, e.g., the DashboardPrompts.txt file 64. The DashboardPrompts.txt file 64 may also be input to the controller 32 of the upgrade verification tool 30.

In the present example embodiment, the DashboardPrompts.text file 64 includes parameters usable by the controller 32 to recreate UI dashboards using the pre-upgrade software 52 and the post-upgrade software 54 for comparison purposes. For the purposes of the present discussion, a UI dashboard may be any UI display screen used to present and/or otherwise provide access to business information or information about a project, task, or other endeavor. Certain dashboards may include, for example, access to reports with data analytics and associated visualizations, tabs and drop-down menus for configuring the arrangement and functionality of the dashboard, i.e., the look and feel of the dashboard, and so on. Some dashboards are used as used as a starting point or launching point to enable user access to various features of the underlying website and associated software, e.g., software applications 52, 54 of FIG. 2.

In the present example embodiment, the controller 32 is shown receiving command line input and/or GUI controls signals 96, which include instructions or commands to run a particular test. The particular test may include one or more tests implemented via one or more of the plugins 34.

The example plugins 34 include a catalog plugin 70, report plugin 72, security plugin 74, scheduler plugin 76, UI plugins 78, dashboard plugin 80, and logical query plugin 82. Note that the various plugins 70-82 are merely examples. The exact types and numbers of plugins used are implementation specific and may vary depending upon the needs of a given implementation.

The example controller 32 is shown including a plugin discovery activator 66 and a plugin comparer activator 68. The plugin discovery activator 66 includes computer code for selectively activating appropriate plugins 70-82 in response to input control signals, e.g., command line input 96. Activating of the plugins 70-82 includes starting of initial tests, also called discovery or analysis tests, on a pre-upgrade BI software application 52 and on a corresponding post-upgrade BI software application 54.

Accordingly, the present example embodiment, the controller 32 into which the plugins 34 plug acts as an interface facilitating communications between and use of the plugins 34 and other network resources and data, such as reports and accompanying data maintained in the log library 86; internal state information characterizing the upgrade verification software 30; network communication resources for communicating with the pre-upgrade system 52 and post upgrade system 54; and so on.

The controller 32 also acts as a plugin driver, e.g., by selectively activating different plugins 34 (e.g., using the plugin discovery activator 66) based on command line input or GUI input control signals 96. For the purposes of the present discussion, a driver may be any computing resource that acts as an interface to one or more modular components, where the interface enables delivery of control signals to the one or more modular components. In the case of a plugin driver, e.g., the controller 32, the modular components represent software modules 70-82, and the driver is said to host plugins. A plugin may be any software module or component (e.g., extension, add-on, etc.) or collection thereof that is adapted to couple with (i.e., communicate with) another software module to add specific features or functionality thereto.

Note that while the plugin discovery activator 66 and the plugin comparer activator 68 are shown as part of the controller 32, that other implementations are possible. For examples, the activators 66, 68 may themselves be implemented as plugins or functions within plugins that may communicate with other existing plugins and that may also monitor and be directly responsive to control signaling input 96 and accompany configuration file 62 input.

In operation, in response to a command (e.g., control signal 96) to run one or more of the plugins 70-82 to test the post-upgrade system 54 based on a comparison with the pre-upgrade system 52, the controller 32 receives the configuration file 62 and any linked files (e.g., DashboardPrompts.txt) as input; and then converts and/or formats one or more sections of the configuration file 62 into computing objects (configuration objects) readable by particular plugin (s) 70-82 to be activated.

Based on the input control signal 96, the indicated plugins (e.g., as indicated or specified via one or more command line arguments) are activated. The timing of the activation of different plugins may be specified by content of the control signal 96. In certain cases, the plugins 70-82 may be activated near simultaneously. In other cases, e.g., when one plugin uses output of another plugin, the running of the plugins 70-82 is strategically sequenced.

Once activated, selected plugins 70-82 begin an initial analysis phase (also called a discovery phase), whereby the plugins leverage configuration objects derived from the configuration file 62 to locate the software systems 52, 54 to be tested; identify parameters to supply during the tests; determine how to label and where to store output log files, and so on, as required to meet the needs of a given implementation.

In the present example embodiment, the initial analysis phase involves accessing a first presentation catalog 56 characterizing the pre-upgrade software system 52 and accessing a second presentation catalog 60 of the post-upgrade software system 54. As set forth above, the accessing of the first presentation catalog 56 and the second presentation catalog 60 by a particular plugin may occur near simultaneously to reduce or eliminate any impacts of changing underlying data regression testing results.

For the purposes of the present discussion, a presentation catalog may be any collection of objects (e.g., folders, files, etc.) that represent a viewable or accessible arrangement of data and/or functionality used by a presentation interface, e.g., webpage, UI display screen, or other manifestation of underlying software.

The catalog may include folders where users may store representations of software customizations or other user-created content. The catalog may store a representation of software content applicable to a given set of one or more software applications, e.g., BI applications. Dashboards and analyses for different database deployments may be arranged in presentation catalogs.

Generally, presentation catalogs may be part of a presentation layer, i.e., a set of software functionality that adds a level of abstraction over a business model layer and/or mapping layer. A presentation catalog may represent data and associated structures as seen by client tools and applications.

A presentation layer may facilitate customer simplification and customization of business models and mapping layers. For example, a presentation catalog may be edited to hide certain database dimensions or to make other dimensions accessible to UIs, and so on. Users may interact with (e.g., edit) a presentation catalog to help ensure that the data is arranged and accessible in accordance with business needs. Certain presentation catalogs also support custom objects and associated custom functionality created by users.

Custom objects may define certain reports, data models, style templates, etc., which may be stored in personal folders of a presentation catalog. Such a folder may store user-created content and associated files and may include a sub-directory structure. Folder content may include shortcuts, BI objects (e.g., analytics, filters, prompts, dashboards, etc.), and other enterprise software objects (e.g., reports, templates, etc.). Each catalog object in certain presentation catalogs may include or be associated with another object or file (e.g., attribute file) that includes additional information, e.g., metadata about the catalog object.

Results of the initial discovery or analysis are then processed or formatted and logged in the log library 86, e.g., as initial results 90 for the pre-upgrade software system 52 and initial results 92 for the post-upgrade software system 54.

The log library 86 may include a directory structure 88 that is accessible to other plugins 34. The so-called common log library 86 may facilitate maintaining test results and diagnostic logs. Exact details of the log library 86 are implementation specific and may vary depending upon the needs of a given implementation.

After the initial analysis or discovery phase, i.e., after initial analysis reports are generated by selected plugins (e.g., selected via command line or UI input and associated control signals 96), the plugin comparer activator 68 then selectively calls compare functions of the selected plugins 70-82.

Each of the selected plugins 70-82 may include a particular compare function or procedure that is specialized for comparing the types of reports generated by the associated plugin during the discovery phase. The plugin comparer activator 68 calls these functions to perform the specialized compare operations that compare analysis results for the first pre-upgrade software system 52 and the second post-upgrade software system 54. Results of comparison operations performed by each compare function of the selected plugins 70-82 are logged as comparison reports, i.e., comparison results 94, in the log library 86.

In general, the log library 86 includes a folder structure 88 that organizes data pertaining to activities (e.g., tests) of the upgrade verification software 30. The data of the log library 86 may be accessible to plugins 34 directly and/or by using the controller 32 as an interface.

Initial test results may be saved as a snapshot of a particular deployment, e.g., the pre-upgrade software application 52 and/or the second software application 54. A second set of tests (which may be implemented by one or more functions of the same plugin used for creating the initial results) may involve comparing the initial test results. Comparison results may illustrate and report any uncovered differences to the user of the tool 30.

To automate a set of tests to be performed by one or more of the plugins 34, a user may specify or select one or more tests using a command line and/or GUI. Note that while the example plugins 70-82 include seven plugins, the numbers and types of different plugins that are used with the upgrade verification software 30 (to perform different respective tests on the software application deployments 52, 60) are implementation specific and may vary.

Generally, plugins may be used to perform various types of tasks, e.g., validating the look and feel of UI dashboards and/or other UI display screen features (e.g., visualizations) or catalog objects by comparing corresponding content from two different software versions 52, 54. Particular plugins may also accept command line arguments and/or statements to define validation-sensitivity thresholds for visualization comparisons or other types of comparisons.

For robust validation of details of dashboard pages or other UI display screens, detailed prompts may be gathered as a collection of parameters representing prompted links captured during testing. For the purposes of the present discussion, a prompted link may be any network address (e.g., URL) and/or path that includes parameters (prompt selections) to be input to a UI display screen or mechanism that then uses underlying software and the parameters to adjust displayed content (displayed via the UI display screen or mechanism).

In certain embodiments, parameter capturing from prompted links may be automatic. In such cases, queries for dashboard data are derived and constructed (where the queries include the parameters), and then child pages for the parent page identified by the link may then be further extracted for use in regression testing or generation of pre/post upgrade system snapshots.

The configuration file 62 (e.g., conFIG.xml file) may be received by the controller 32 as a single input file that passes configuration parameters into the controller 32. The host process, i.e., controller 32, then consumes the configuration file and constructs corresponding configuration objects that include configuration information in the configuration file 62, in preparation for delivery of the configuration information as computing objects readable by the plugins 34.

Example configuration properties include runtime properties; user-specified test preferences; identification of a pre-upgrade target server (e.g., the server hosting the pre-upgrade software application 52) and associated network address or path to an associated catalog file (e.g., the first presentation catalog 56); identification of post-upgrade target server (e.g., the server hosting the post-upgrade software application 54) and associated network address or path to an associated catalog file (e.g., the second presentation catalog 60); identification of tests and associated plugins that are available to run; identification of a results file and or path to log files to use, and so on. Note that in certain implementations, some configuration information may be specified via command line input (e.g., information indicating that only a specific plugin is to be run at a specific time.

Pseudo code for an example configuration file is as follows:

```
<?xml version="1.0" encoding="UTF-8"?>
-<TestConfiguration>
  -<Deployment description="First Test Target" name="PreUpgrade">
    -<Server>
```

```xml
                <!-- AnalyticsURL Needs to point to the analytics page -->
                <!-- ex:
                <AnalyticsURL>http://servername:9704/analytics</AnalyticsURL> -->
                <!-- ex:
                <AnalyticsURL>https://servername/analytics</AnalyticsURL> -->
                <!-- If you are using a test certificate on the server for SSL
                and want to bypass SSL certificate validation, set the
                IgnoreSSLCertErrors to true. This setting is strictly for Test
                environments only -->
            <AnalyticsURL/>
            <UserName/>
            <Password/>
            <IgnoreSSLCertErrors>false</IgnoreSSLCertErrors>
        </Server>
    </Deployment>
-<Deployment description="Second Test Target" name="PostUpgrade">
    -<Server>
            <!-- AnalyticsURL Needs to point to the analytics page -->
            <!-- ex:
            <AnalyticsURL>http://servername:9704/analytics</AnalyticsURL> -->
            <!-- ex:
            <AnalyticsURL>https://servername/analytics</AnalyticsURL> -->
            <!-- If you are using a test certificate on the server for SSL and want to
            bypass SSL certificate validation, set the IgnoreSSLCertErrors to true.
            This setting is strictly for Test environments only -->
        <AnalyticsURL/>
        <UserName/>
        <Password/>
        <IgnoreSSLCertErrors>false</IgnoreSSLCertErrors>
    </Server>
</Deployment>
-<Tests>
    -<TestPlugin name="com.biee.bvt.plugin.catalog" enabled="true">
        -<Test name="GetCatalogTest" enabled="true">
            <Parameter name="CatalogRoot" value="/"/>
        </Test>
    </TestPlugin>
-<TestPlugin name="com.biee.bvt.plugin.ui" enabled="true">
            <Parameter name="CatalogRoot" value="/"/>
            <!-- how many threads to spawn to load reports, should be greater than 0,
            less than 50 -->
        <Parameter name="ThreadQueueSize" value="1"/>
            <!-- Timeout for loading each report in MSecs should be between 5 secs
            and 10 mins -->
        <Parameter name="ThreadTimeout" value="60000"/>
            <!-- Which BrowserType to use to load reports, Firefox, InternetExplorer.
            Leave empty for default browser -->
        <Parameter name="BrowserType" value=""/>
        -<Test name="FindNotRenderedComponents" enabled="false">
                <!-- ScoreThreshold should be between 0.00 and 1.00 -->
            <Parameter name="ScoreThreshold" value="0.95"/>
            <Parameter name="DisabledPluginImageTemplate" value=""/>
    </Test>
    -<Test name="FindReportSnapshotDifferences" enabled="true">
            <!-- ScoreThreshold should be between 0.00 and 1.00 -->
        <Parameter name="ScoreThreshold" value="0.95"/>
    </Test>
    -<Test name="FindDashboardSnapshotDifferences" enabled="true">
        <Parameter name="PromptInputFile" value="DashboardPrompts.txt"/>
        <Parameter name="ScoreThreshold" value="0.95"/>
    </Test>
</TestPlugin>
-<TestPlugin name="com.biee.bvt.plugin.report" enabled="true">
            <!-- Timeout for loading each report in MSecs should be between
            5 secs and 10 mins -->
        <Parameter name="ReadTimeout" value="15000"/>
        -<Test name="ExportReportsToCSV" enabled="true">
            <Parameter name="CatalogRoot" value="/"/>
                <!-- Set a limit on the maximum tolerance for fluctuations in
                floating point numbers in report data. Ex:"0" for no tolerance. "0.1,
                "0.001", etc.-->
            <Parameter name="DiffTolerance" value="0"/>
    </Test>
```

```
    </TestPlugin>
    -<TestPlugin name="com.biee.bvt.plugin.logicalquery" enabled="false">
      -<Test name="GetLogicalQueries" enabled="true">
          <Parameter name="CatalogRoot" value="/"/>
      </Test>
    </TestPlugin>
    -<TestPlugin name="com.biee.bvt.plugin.dashboard" enabled="true">
      -<Test name="ExportDashboardsToXML" enabled="true">
          <Parameter name="CatalogRoot" value="/"/>
              <!-- Paste the prompted links to the following file-->
          <Parameter name="PromptInputFile" value="DashboardPrompts.txt"/>
          <Parameter name="ExportAllDashboards" value="true"/>
              <!-- Set a limit on the maximum tolerance for fluctuations in
                  floating point numbers in report data. Ex:"0" for no tolerance. "0.1,
                  "0.001", etc.-->
          <Parameter name="DiffTolerance" value="0"/>
      </Test>
    </TestPlugin>
  </Tests>
  -<Results>
       <LogPath timestampFolders="false">Results</LogPath>
   </Results>
</TestConfiguration>
```

The configuration file 62 may be manually edited by a user and/or automatically constructed using a GUI in communication with a module specialized in collecting configuration information need to perform particular types of regression testing.

The upgrade verification tool 30 may generate several types of output files, depending upon which of the plugins 64 and corresponding tests are run. Diagnostic output of a particular plugin 34 may store controller and plugin logs in the same file. Each entry in the log file may be time stamped and may support multiple logging levels (e.g., failure, warning, verbose, etc.).

Test results are stored in separate folders (of the log library 86) for each run (pre-upgrade, post-upgrade, test run instance, per server, etc.). The folder structure is preferably clear and readily understandable by laypersons.

The result output file, e.g., log file, may bean XML file or portion thereof. A master XML output log or file (e.g., as illustrated by the log library folders 88) may collect results files from plural operations of the plugins 34. A result output folder may include a sub folder for generated resource files (e.g., PDF, XLS, HTML files, etc.). Results may be structured to enable automated comparison of two result files. Result files may be easily archived, e.g., to facilitate storage of results, emailing of results, etc.

In the present example embodiment, the upgrade verification tool 30 meets various implementation-specific objectives. Example objectives include: the tool 30 may support both the UI and the command line execution; the tool 30 may not require execution on any of the BI servers, and it may support remote execution; the tool 30 may support in-place and out-of-place upgrade; the tool 30 may keep an internal state (e.g., via the internal state memory or cache 84) and when it is executed, it may remember the last state it was left at; a user may be able to run the tests multiple times; the tool 30 may be flexible enough to address various deployment configurations; users may be able to select what actions to execute; the tool 30 may be able to compare results run before and after the upgrade; and an engineering team may readily and easily implement new actions on the tool 30 (e.g., by adding new plugins, etc.).

To facilitate meeting the above objectives, a plugin model is used for the extensible upgrade verification tool 30. The tool 30 includes the controller 32, which acts as a host application for plugins 34 that can be readily added and/or removed, or otherwise selectively used, by a user, e.g., tester, developer, customer, etc.

Each plugin 34 may address a common scenario that is to be verified and/or validated. Once an initial test run is executed using a particular plugin 34, the results may be saved as a snapshot of the tested deployment 52, 54. The initial test results for each deployment 52, 54 are then compared using the initial results, and any differences may be reported to the user via one or more comparison reports.

After test run completes, and all log files written, then the controller 32 (i.e., host or plugin driver) may start comparison operations (e.g., using the plugin comparer activator 68) to identify differences in the two test runs.

Comparer modules of the different plugins 34 can be implemented differently by different plugins, as associated business logic may vary significantly among feature areas.

Each plugin 30 may implement an interface, as discussed more fully below, that accepts two well-defined log files (e.g., initial results logs for initial tests on pre-upgrade and post-upgrade software systems 52, 54), and will iterate though all entries in the initial results logs and/or reports, comparing the results.

For example, the security plugin might be comparing users, groups, access rights, etc., and may implement its own specialized logic to identify differences. Similarly, the report plugin 72 may use PDF comparers, XLS comparers, HTML comparers, etc. to identify differences in reports.

The customer or user of the upgrade verification tool 30 may fine-tune the comparers, e.g., by adjusting comparison thresholds, to reduce or minimize false-positives. A user may trigger execution of comparison operations multiple times, thereby further enabling fine-tuning of the comparer modules.

The controller 32 may accept command line arguments and/or signals from a GUI to execute only a particular comparer on a particular set of existing initial test results.

By default, a comparer module may run after the executions of initial tests (i.e., analysis/discovery tests) if no arguments indicating otherwise are passed to the host, i.e., controller 32 via the input control signals 96 and/or the configuration file 62.

Accordingly, in general, regressions may be introduced in BI systems 52, 54 throughout the lifecycle of the BI systems 52, 54. Examples of specialized regression tests performed by various plugins 34 include a catalog verification test, a report verification test, a security verification test, a scheduler test, a UI test, a dashboard UI test, and a logical query test, which are performed by respective plugins 70-82.

The plugins 34 and accompanying controller 32 may be implemented in accordance with (i.e., using) a plugin framework. Use of a plugin framework to implement the upgrade verification tool 30 enables use of an open framework architecture; a clear and consistent API, a built-in integrity check; plugin dependency checks; strongly typed extension parameters; lazy plugin activation; on-the-fly plugin registration and activation, and so on.

Generally, use of a plugin model may facilitate management of relatively small test areas; clear definitions of system architecture; use of an extensible framework; tight control over application consistency; and efficient memory resource usage.

Each plugin 70-82 may implement an interface that includes the following example functions and associated functionality:

TABLE 1

| | |
|---|---|
| void doStart( ) | As may be provided by a plugin framework. Called when plugin is loaded. |
| void doStop( ) | As may be provided by a plugin framework. Called when plugin is unloaded |
| void initialize( ) | Called when the plugin is about to start. Do common initialization at this point. |
| String getDescription( ) | Called by the host 32 to get a brief description about the plugin. Will be displayed to the user on the UI |
| List<Test> getTests( ) | Called by the host 32 to get the list of tests the plugin provides. The Test class is TBD |
| void RunTest(String args[ ])) | Called by the host 32 to start execution of a test. The args parameter is TBD. |
| ComparisonResult CompareResults(TestRunPre, TestRunPost) | Called by the host 32 to compare two sets of run results. The plugins will implement their own logic to compare two rests of results. |

Various functions indicated in the left column of Table 1 may represent modules included in each plugin 34. The right column of Table 1 provides a brief description of what the corresponding function in the left column does. Note that various functions indicated in Table 1 above and Table 2 below may be provided by another type of computing framework, such as a custom framework, without departing from the scope of the present teachings.

Note that specific plugins may include additional functions and/or functionality for performing specific functions. For example, the catalog plugin 34 may include the following functions:

TABLE 2

| | |
|---|---|
| void doStart( ) | As may be provided by a plugin framework. Called when plugin is loaded. |
| void doStop( ) | As may be provided by a plugin framework. Called when plugin is unloaded. |
| void initialize( ) | Called when the plugin is about to start. Do common initialization at this point. |
| String getDescription( ) | Called by the host 32 to get a brief description about the plugin. |
| void setupTestRun(TestConfiguration config, Deployment deployment, String outputFolder) | Called by the host 32 to prepare the Plugin prepared to execute the run, i.e., tests. |
| @PluginTest(<br>    name="GetCatalogTest",<br>    description = "This test iterates through the Catalog objects"<br>)<br>void GetCatalogTest( ) | The GetCatalogTest entry point that iterates through catalog objects and records the metadata of each item in the presentation catalog. This metadata is later used in the CompareResults phase. |
| void CompareResults(String firstResultFolder, String secondResultFolder, String compareOutputFolder, TestConfiguration config) | Called by the host 32 to compare two sets of run results. Compares the metadata collected in the GetCatalogTest phase for two deployments. |

In the present example embodiment, the catalog plugin 70 (also called a catalog verification plugin) is adapted to enumerate all items in the catalog (for each deployment 52, 54), and compile an inventory. Key properties of catalog items are reported and stored in the log library 86 as output of the catalog plugin 70.

The catalog plugin 70 may include computer code for counting and comparing the number of metadata and/or web catalog objects in the presentation catalogs 56, 60. The catalog plugin compares catalog items 56, 60 of two deployments 52, 54 and reports differences (i.e., regressions).

Each of the presentation catalogs 56, 60 may be cycled through by the catalog plugin 70, which after the cycling or iteration through the deployment catalogs 56, 60, records metadata of all discovered items. This metadata may be saved locally to disk. Later, a user may run the tool 30 to compare the collected catalog metadata of two deployments 52, 54. The catalog plugin 70 may store test results in the log library 86 in an HTML, XML, and/or other format, depending upon the needs of a given implementation.

The catalog plugin 70 may include specialized computer code to identify and/or highlight several types of regressions. For example, the catalog plugin 70 may detect if any catalog items were removed during an upgrade; detect what catalog items were added during an upgrade; detect if any items are not accessible after an upgrade; detect if any links are broken by an upgrade; list the items that were modified during an upgrade. Modifications may include modifications to a path, type, caption, attribute(s), signature(s), target path, owner identification, item properties, and so on.

In the present example embodiment, the catalog plugin 70 meets the following objectives: the plugin 70 is loaded and executed by the upgrade verification tool 30 controller 32; the plugin 70 runs tests that and reports any failures or not failures if everything pass; the plugin 70 supports in-place and out-of-place upgrades; users may run catalog plugin tests multiple times; the plugin 70 may store results for each deployment 52, 54 that it runs for in a folder (e.g., a folder of the log library 86) specified by the tool 30 and associated configuration file 62; the plugin 70 may be able to compare results run before and after the upgrade; an engineering team may readily and easily implement new actions on the plugin 70; the plugin 70 may report results in a standard format (e.g., XML format), which can then be transformed into HTML format or other formats, as needed for a particular type of analysis; and so on.

Similarly, the example report plugin 72 may include computer code for generating reports and storing output in all supported formats, e.g., to facilitate comparisons with results of subsequent runs. The report plugin 72 may export results of initial analysis and comparison operations to a Microsoft Excel (CSV) or other file type to facilitate performing additional comparisons.

The security plugin 74 may enumerate all users, groups, and permissions on catalog objects, reports, schedules, etc.

The scheduler plugin 76 may verify that regression testing jobs can be scheduled, and may list scheduled jobs.

The UI plugin 78 may verify the UI components of a web application (e.g., dashboards, analysis screens, etc.) used to interface with the pre-upgrade BI system 52.

The UI plugin 78 and/or dashboard plugin 80 may include computer code for taking screen shots of analytics and associated visualizations and UI display screens (and associated dashboards) for subsequent comparison operations.

The dashboard plugin 80 may include computer code for exporting initial results and comparison results to an XML file; generating comparison reports in XML or other file format; providing more in-depth comparisons as to compared to those provided by the UI plugin 78; and so on. Note that for dashboards requiring prompted content, the same prompt values (e.g., as maintained by the DashboardPrompts.txt file 64) used by the UI plugin 78 may be used.

The logical query plugin 82 may include computer code for downloading and saving logical Structured Query Language (SQL) that is generated for analysis, e.g., as it may appear on an advanced tab in certain BI enterprise software applications. The logical query plugin 82 may further determine whether logical SQL has changed between pre-upgrade and post-upgrade systems 52, 54. If the SQL has changed; then the associated BI server may issue different physical queries to query underlying data sources (e.g., data sources provided by the backend databases 16 of FIG. 1).

In summary, FIG. 2 shows the basic architecture of an embodiment of a verification tool 30. In FIG. 2, the tool's functionality can be provided in whole or in part by so-called verification plugins 34, such as the catalog plugin 70, report plugin 72, security plugin 74, scheduler plugin 76, UI plugin 78, dashboard plugin 80, and logical query plugin 82.

Figure 3:
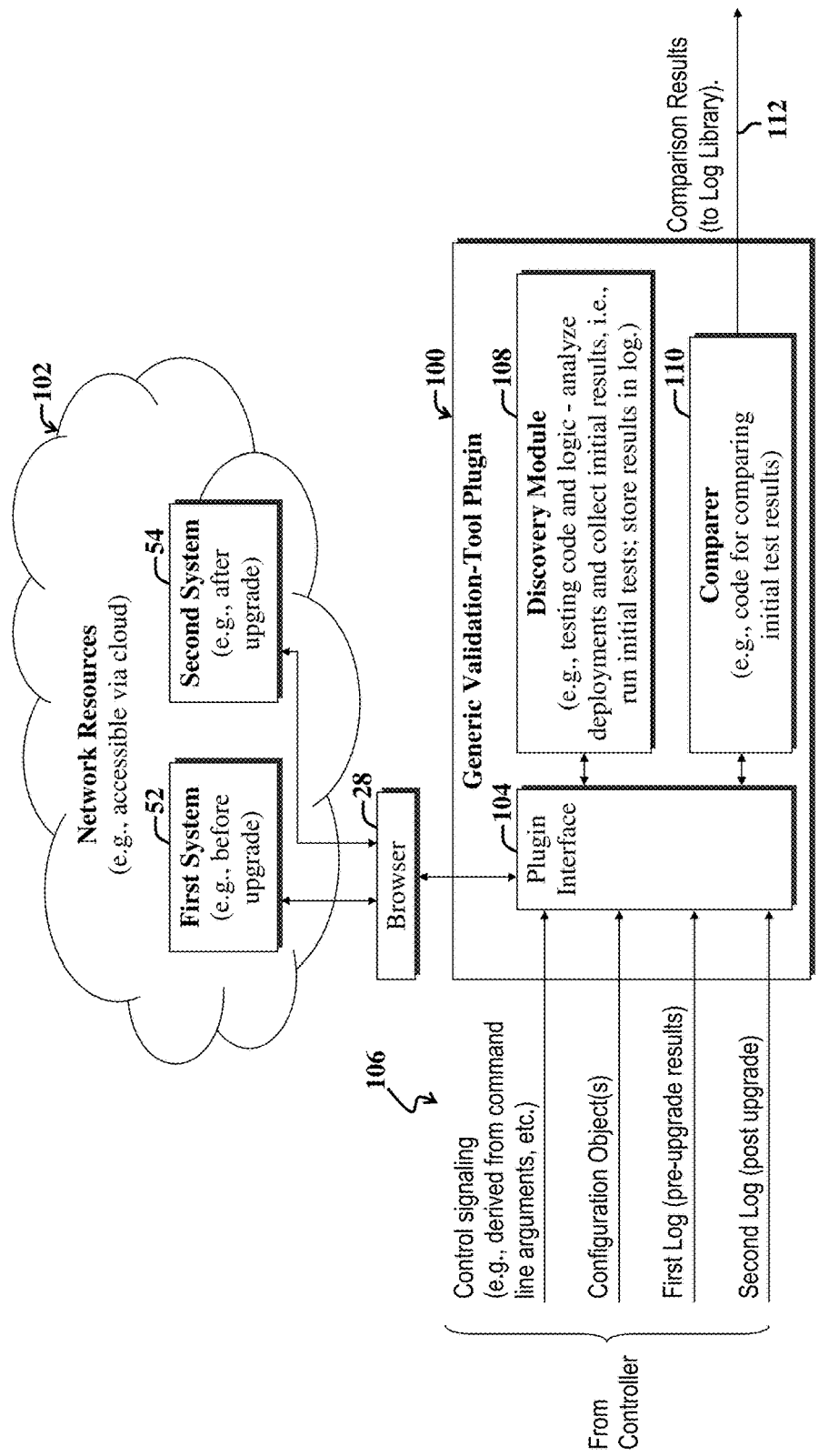
FIG. 3 illustrates additional detail of an example generic plugin that may be plugged in to the upgrade verification tool controller of the example systems of FIGS. 1-2.

FIG. 3 illustrates additional detail of an example generic plugin 100 that may be plugged in to the upgrade verification tool controller 32 of the example systems 10, 50 of FIGS. 1-2.

In the present example embodiment, the example plugin 100 includes a first discovery component or function 108 and a second comparer component of function 110, which may intercommunicate and communicate with other computing resources (e.g., browser 28, network resources 102, etc.) via a plugin interface 104.

The plugin interface 104 receives control signals, configuration results, and reports or logs 106 from the controller (e.g., the controller 32 of FIGS. 1 and 2); delivers the control signals to a discovery module 108 and comparer module 110, and includes functionality for activating a browser 28 (e.g., using a batch file with an entry to activate a specified browser when the batch file is processed) to enable the modules 108, 110 to communicate with and/or otherwise analyze the first software system (pre-upgrade) 52 and the second software system (post-upgrade) 54.

In operation, when a particular regression test (specified via command line arguments or commands) that uses the validation-tool plugin 100 is specified or called, the discovery module 108 is activated. The discovery module 108 includes computer code for analyzing the pre-upgrade software system 52 and the post upgrade software system 54 and producing initial reports based on the analysis. The discovery module 108 may activate a local (client-side) browser 28 to facilitate accessing the software systems 52, 54 via a network and associated network addresses, e.g., Uniform Resource Locators (URLs).

After data for the initial reports is collected, and associated initial reports are constructed, the comparer module 110 then compares the reports generated for the first software system 52 and second software system 54.

The exact nature of the comparison is implementation specific and may vary depending upon the needs of a given implementation and specialized tasks associated with the particular plugin 100. For example, a dashboard plugin report by the comparer module 110 (e.g., when the plugin 100 represents a dashboard plugin) may juxtapose, in a comparison report document, different UI display screens produced by the first software system 52 and second software system 54 in response to similar input parameters (e.g., as captured via prompted links, as discussed more fully below). A similarity between juxtaposed screenshots of dashboard UI display screens may be rated or scored and then compared to a user-configurable threshold to determine whether the post-upgrade software system 54 passes or fails a consistency check for a particular dashboard. Note that conventional image matching algorithms (e.g., to match dashboard images) may be readily modified as needed by those skilled in the art and used to implement embodiments discussed herein, without undue experimentation.

Similarly, if the plugin 100 represents a catalog plugin (or other type of plugin), the associated plugin may employ the discovery module 108 to analyze objects of the presentation catalogs of the pre-upgrade system 52 and post-upgrade system 54, and then compare the objects. Comparison criteria may indicate whether a particular regression is flagged in a final comparison report 112 generated and logged via the comparer module 110.

Note that URLs for presentation catalogs of the first software system 52 and the second software system 54 may be supplied to the plugin 100 via configuration objects derived from the configuration file 62 of FIG. 2. In certain implementations, username and password information to enable logging into the systems 52, 54 is also provided via the configuration objects along with the URLs. In other implementations, username and password information is captured using prompts, e.g., pop-up windows asking the user to input their username and password.

The browser 28 may be automatically activated by the plugin 100 and directed to browse to websites indicated via the URLs specified in the configuration file (e.g., file 62 of FIG. 2) and configuration objects derived therefrom. Accordingly, the browser 28 automatically browses to particular website(s) hosting the software 52, 54 to be tested, using URLs and parameters in the configuration file 62 to access data and functionality of the software 52, 54; and log results of the testing.

Similarly, a security plugin may compare users, groups, access rights or permissions, and so on, and will implement its own logic to identify differences. A report plugin might be using PDF comparers, XLS comparers, HTML comparers, etc. to identify differences in reports. Similarly, other specialized plugins may involve conducting specialized other comparison reports that compare particular features, e.g., data and/or functionality of the software systems 52, 54 and produce a corresponding report.

Also, note that in certain implementations, the discovery module 108 and/or the comparer module 110 may be implemented separately from the plugin 100. For example, a specialized comparer plugin that plugins into the controller 32 of FIG. 2 may obviate use of the comparer module 110 in certain implementations, without departing from the scope of the present teachings.

Figure 4:
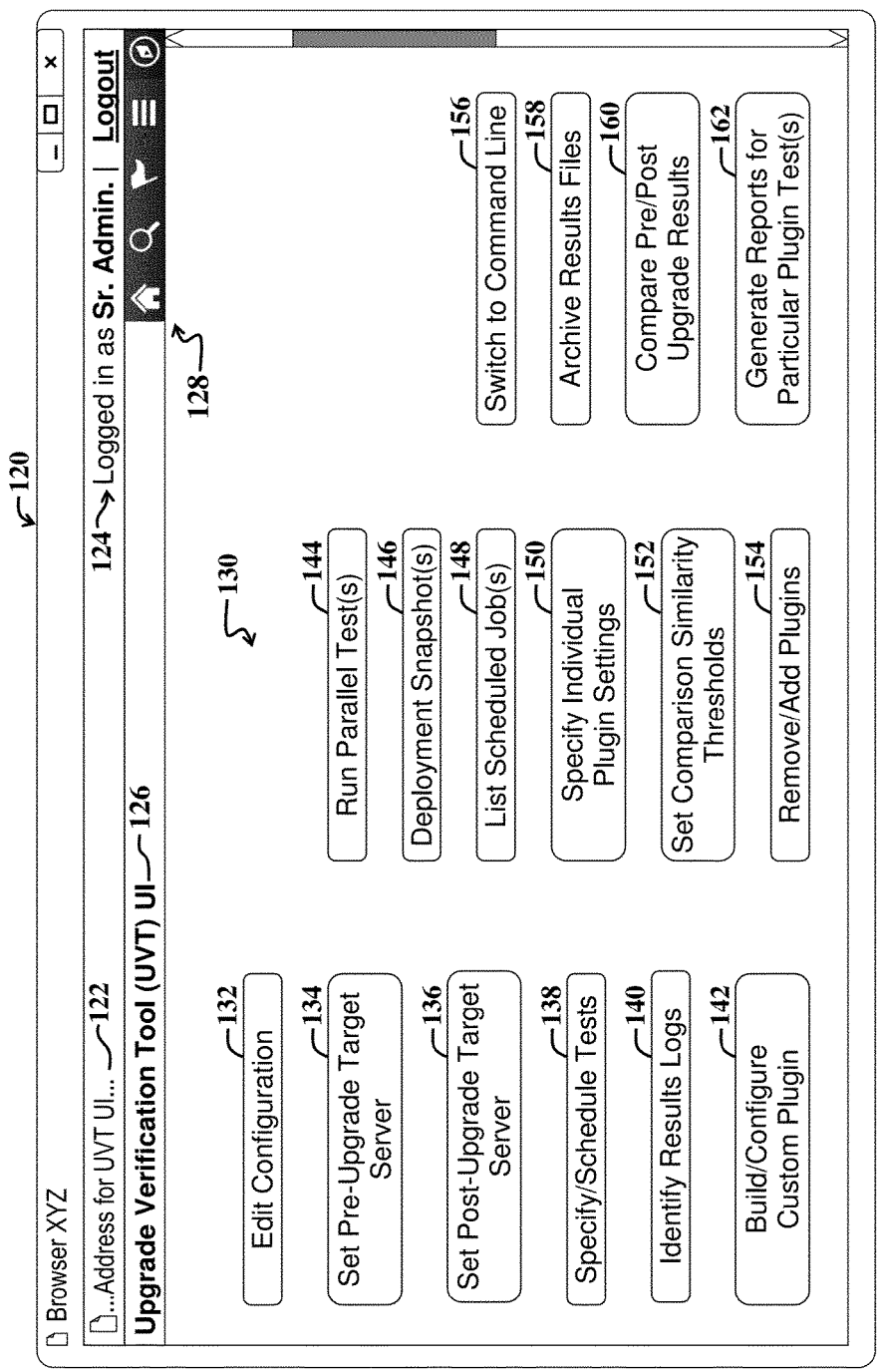
FIG. 4 illustrates a first example User Interface (UI) display screen suitable for use with the upgrade verification tool of FIGS. 1-2 and showing various user options, e.g., to select tests for execution, etc., which may alternatively be implemented via a command line interface.

FIG. 4 illustrates a first example User Interface (UI) display screen 120 suitable for use with the upgrade verification tools 10, 50 of FIGS. 1-2 and showing various user options 130, e.g., to select tests for execution; to manage the tests (plugins); to input configuration values; to provide windows for displaying and analyzing results, and so on. Such user options 130 may additionally or alternatively be implemented via a command line interface, as may be activated in response to user selection of a switch-to-command line button 156.

Note that embodiments may employ a GUI interface (as exemplified by the UI display screen 120) and/or a command line interface (e.g., the command line interface 26 of FIG. 1) to facilitate receiving user commands. Accordingly software functionality associated with the various UI controls 130 may be specified via command line arguments, in addition to or as opposed to via UI control input.

In the present example embodiment, the first UI display screen 120 is implemented via a browser. Various UI controls 130 are accessible via a webpage representing an upgrade verification tool UI (as shown by a screen title 126). A user, e.g., administrator, has provided login credentials (as shown by login indicia 124) and has permissions to access test logs, run regression tests, and so on, as indicated via available UI controls 128, 130.

For the purposes of the present discussion, a UI control may be any displayed element or component of a user interface display screen, which is adapted to enable a user to provide input, view data, and/or otherwise interact with a user interface. Additional examples of user interface controls include hyperlinks, drop down menus, menu items, tap-and-hold functionality, and so on. Similarly, a user interface control signal may be any signal that is provided as input for software, wherein the input affects a user interface display screen and/or accompanying software application associated with the software.

With reference to FIGS. 1-2 and 4, the first example UI display screen 120 may represent an example of the GUI screen 24 of FIG. 1 and used to facilitate user interaction with the upgrade verification tool 30 of FIGS. 1-2. The first example UI display screen 120 includes various UI controls 130 representing user options to interact with and use functionality of the underlying upgrade verification tool 30 (also called upgrade verification software) of FIGS. 1-2.

Note that while the various UI controls 130 are shown as buttons, other types of UI controls and features are possible. Furthermore, user selection of one or more of the buttons 130 may trigger display of an additional UI display screen or window, whereby a user may provide additional data or queries or may otherwise further interact with the underlying upgrade validation or verification tool 30 of FIGS. 1-2 and associated plugins.

The example UI controls 130 include an edit-configuration button 132. User selection of the edit-configuration button 132 may trigger opening of a configuration editor window with additional options for specifying configuration information, e.g., URLs for software applications and associated presentation catalogs (e.g., for pre-upgrade and post-upgrade software systems); parameters to input to computing objects maintained in different presentation catalogs as part of initial testing, and so on.

User selection of a first target server option 134 may also trigger display of a field, whereby a user may specify a particular target server and associated URL (or other network address and/or file system path) for a first software application to be tested. Similarly, user selection of a second target server option 136 may also trigger display of a field, whereby a user may specify or otherwise enter a URL for a particular target server that hosts a second software application to be tested.

Similarly, a test-scheduling option 138 provides a user option to open another UI display screen with UI controls enabling scheduling of different tests (e.g., corresponding to different upgrade verification tool plugins) on specified software applications (e.g., pre-upgrade and post-upgrade software systems).

A results-log identification control 140 provides user options to specify paths to results logs, e.g., as may be maintained via a log library 86 file system directory.

User selection of a build/configure-custom option 142 may trigger display of an additional UI display screen with controls for editing and/or developing a custom plugin. For example, the build/configure-custom option 142 may provide a link to a software development framework to toolkit.

A run-parallel tests option 144 may provide user options for scheduling tests on pre-upgrade and post-upgrade systems near simultaneously. Additional options for sequencing the performance of specialized tests by different plugins may also be provided, e.g., via a subsequently displayed dialog box, window, tab, etc., that may appear in response to user selection of run-parallel tests option 144.

An example deployment-snapshot option 146 provides user options for enabling generation of a report that illustrates metadata describing an identified software application deployment (e.g., a pre-upgrade and/or post-upgrade deployment). User selection of the deployment-snapshot option 146 may trigger automatic display of another window with information characterizing results of an analysis of a particular software application deployment.

A scheduled-jobs option 148 provides a user option to trigger display of a listing of scheduled jobs, e.g., tests to be run by the upgrade verification software 30 of FIGS. 1-2.

A plugin-settings option 150 provides user options to provide and/or edit settings for individual plugins used by the verification software 30 of FIGS. 1-2.

A threshold option 152 provides user options to set thresholds used by comparer modules of different plugins, e.g., to determine whether particular presentation catalog objects are sufficiently matched between pre-upgrade and post-upgrade systems to warrant a pass or fail determination or to otherwise trigger an alert or indication.

A remove/add-plugin option 154 provides user options to install and/or uninstall plugins into the controller 32 of the underlying upgrade verification software 30 of FIGS. 1-2.

The switch-to-command line option 156 provides a user option to open a command line interface, e.g., DOS, Linux, Unix, etc., prompt. The resulting command line interface may accept user input via commands and parameters (e.g., command line arguments) specified via text.

An archive option 158 provides user options to backup or otherwise store results files. User options for selecting files from a log library to backup or archive may be provided in a window that may appear in response to user selection of the archive option 158.

A report-comparison option 160 provides user options to specify and activate comparer modules of specified plugins, e.g., to run different types of compare tests that compare metadata and functionality of pre-upgrade and post upgrade software systems. Alternatively, or in addition, user selection of the report-comparison option 160 may run a separate plugin that is specialized to compare and/or compile reports output from other plugins.

A specific-report option 162 provides user options to specify particular reports to be constructed based on plugin tests that are run against a specified pre-upgrade and/or post-upgrade system.

Note that UI controls 130 (shown as buttons in FIG. 4) are merely examples and may vary without departing from the scope of the present teachings. For example, one or more of the controls 132-162 may be omitted; the controls 132-162 may be replaced with drop-down lists; and so on. Furthermore, as different plugins are added or removed from a particular upgrade verification tool, associated options provided by a UI, such as the UI display screen 120, may also change accordingly.

Hence, the first example UI display screen 120 provides various user options 130 to facilitate managing tests (and associated plugins); inputting configuration values; including windows for displaying and analyzing results, and so on.

Figure 5:
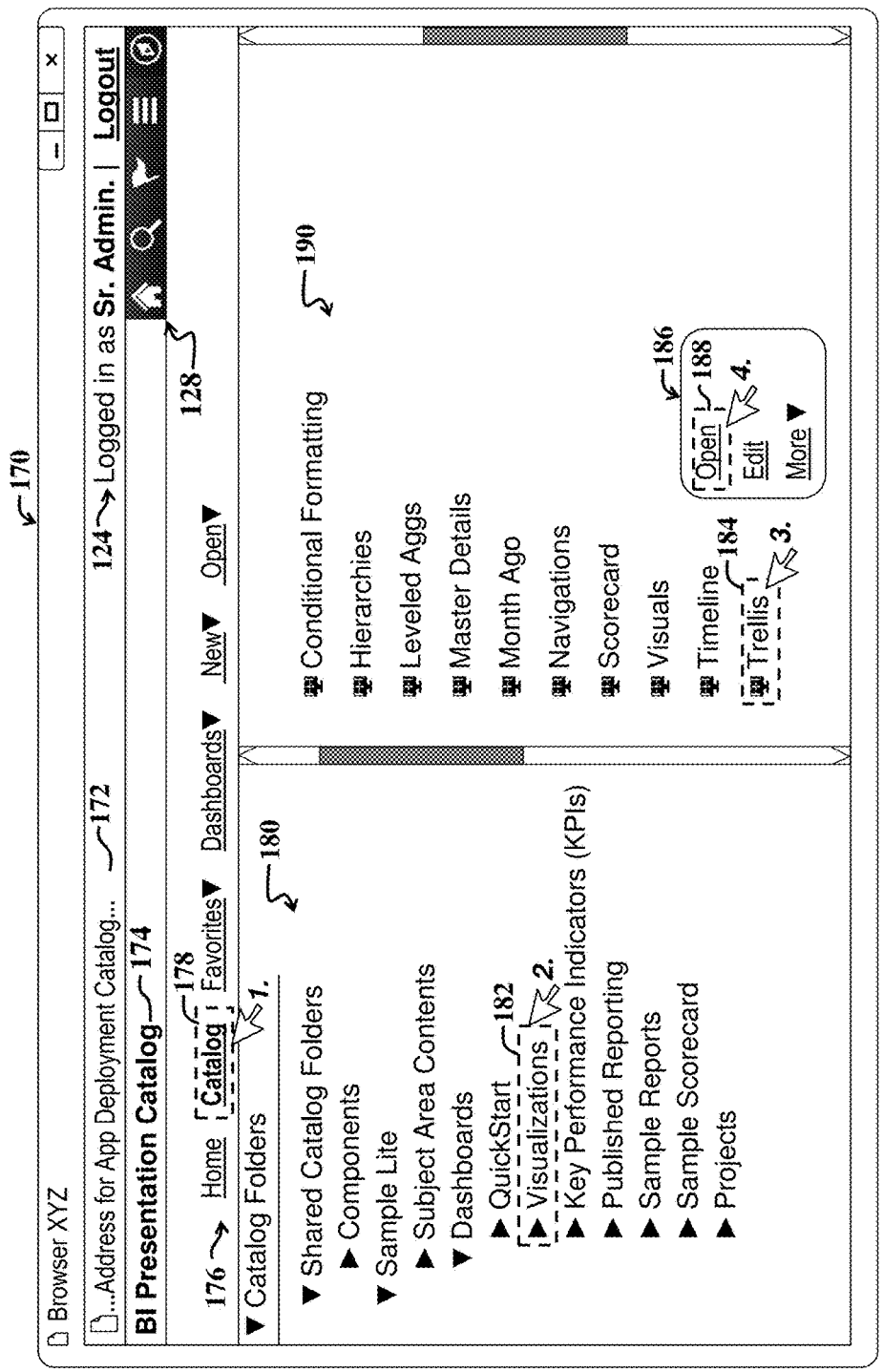
FIG. 5 illustrates a second example UI display screen usable with the upgrade verification tool of FIGS. 1-2 to facilitate selecting catalog objects for use by a UI plugin of the upgrade verification tool.

FIG. 5 illustrates a second example UI display screen 170 usable with the upgrade verification tool 30 of FIGS. 1-2 to facilitate selecting catalog objects 180 for use by a UI plugin of the upgrade verification tool 30. The catalog objects 180 may represent catalog objects of a particular pre-upgrade or post-upgrade software application to be involved in regression testing as discussed herein.

The second example UI display screen 170 is implemented via a browser window. A URL 172 identifies the webpage used to display the screen 170. An example catalog being navigated is called a BI presentation catalog 174.

Among various UI controls 176 or tabs, a user has selected a catalog option 178, which triggers display of associated catalog folders 180. Note that folders and/or files of a presentation catalog may represent catalog objects.

In the present example embodiment, a user has selected visualizations 182 from the listing or directory structure 180 of catalog objects. User selection of the visualizations option 182 triggers adjacent display of various visualizations 190 available to the underlying software to be tested.

The user has selected a Trellis visualization option 184, which then triggers display of a pop-up menu 186 with an open option 188 to open the associated visualization(s) and UI display screens or dashboards.

Note that in general, for specific prompt values to be used in a test, the prompt values are provided in a file, such as the DashboardPrompts.txt file 64 of FIG. 2. To collect prompt values for a particular tests, a user may navigate to a dashboard(s) or other UI display screen to be tested; supply prompt values on dashboard prompts (e.g., inputs using UI controls); apply the prompt values; edit webpage options and choose to create a prompted link, as discussed more fully below with reference to FIG. 6.

After a prompted link is created, the associated URL representing the prompted link will incorporate parameters applied to the UI display screen in response to user interaction therewith, e.g., in response to the user providing adjustments using UI controls. The URL for the prompted link may be copied and pasted into the DashboardPrompts.txt file. If more than one dashboard is to be tested, the above steps may be repeated. Note that in certain implementations, capture of prompted links may be automated, without departing from the scope of the present teachings.

Figure 6:
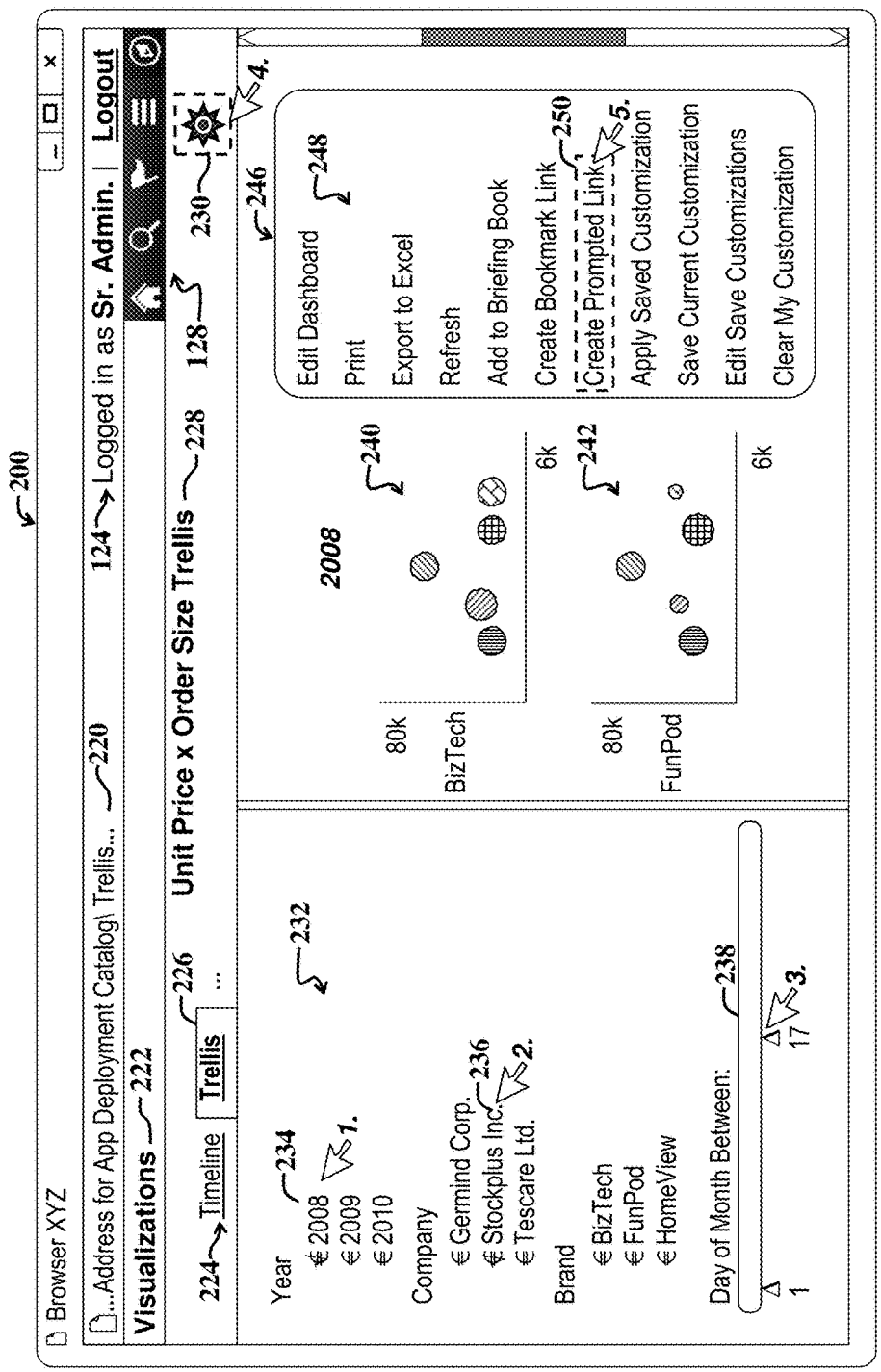
FIG. 6 illustrates a third example UI display screen after a user has interacted with an object selected in FIG. 5 to create and copy parameters for use by the UI plugin of the upgrade verification tool.

FIG. 6 illustrates a third example UI display screen 200 after a user has interacted with a catalog object 184 selected in FIG. 5 to create and copy parameters for use by a UI dashboard plugin (e.g., the plugin 80 of FIG. 2) of the underlying upgrade verification tool (e.g., the tool 30 of FIG. 2).

The example UI display screen 200 represents a browser window showing content associated with a visualizations section 222 indicated by a URL 220 to the section. Among selectable tabs 224, a Trellis tab 226 is automatically selected in response to user selection of the trellis object 184 of FIG. 8. In the present example embodiment, user selection of the Trellis object 184 of FIG. 8, triggers display of the second UI display screen 200. The example selected Trellis tab 226 may represent Unit Price by Order Size visualizations (e.g., as indicated by a visualization title 228).

Visualization data and parameters may be filtered and/or otherwise adjusted using visualization UI controls 232. In the present example embodiment, a user has selected a particular year via a first checkbox 234, a particular company via another checkbox 236, and a time range via a slider 238. The resulting selections generate prompt data that specifies the selections. Furthermore, the selections result in automatic updating of associated visualizations 240, 242.

After the user makes adjustments to the visualizations 240, 242 using the controls 232, the user selects a drop-down menu control 230 to trigger display of a drop-down menu 246 with various options 248. The various options 248 include a UI control 250 for creating a prompted link.

User selection of the prompted-link control 250 may automatically generate a set of parameters that may be pasted into (or otherwise input to) a configuration file or other file (e.g., the DashboardPrompts.txt file 64 of FIG. 2).

In summary, with reference to FIGS. 5 and 6, UI display screens 170, 200 are shown whereby a user generates a dashboard page 200 and provides the parameters, or values, for the page (e.g., via the controls 232) to an underlying upgrade verification tool so that an analogous page with the same values can be generated for both pre-upgrade and post-upgrade versions of the software application or instance/deployment to be tested.

In a particular embodiment, a user logs into a BI system and navigates to a dashboard page. In FIG. 5, a user can do this by clicking the "Catalog" menu option or tab 178 to expand the folder structure to a dashboard (e.g., "Visualizations" 182). The user then clicks to open a preferred page, e.g., "Trellis" 184 in this example.

Next, the user specifies the desired prompt values for the dashboard. As shown in FIG. 6 these prompt values include "2008," "Stockplus Inc.," and a range between 1-17. The user then clicks on the page options icon 230 (gear shaped on the upper right corner), and selects "Create Prompted Link" 250 in the opening menu 246.

The browser address bar is updated with the link 220 that contains the prompt values in a specific format. The user may select this text from the browser address bar and copy it (e.g., Ctrl+C for Windows). The user may then open the DashboardPrompts.txt file (e.g., block 64 in FIG. 2); paste the copied text into this file on a new line; and save the file. The next time the upgrade verification tool is run, it will process this file and will use the prompt values that have been specified in this text file to render the dashboards for comparison.

Figure 7:
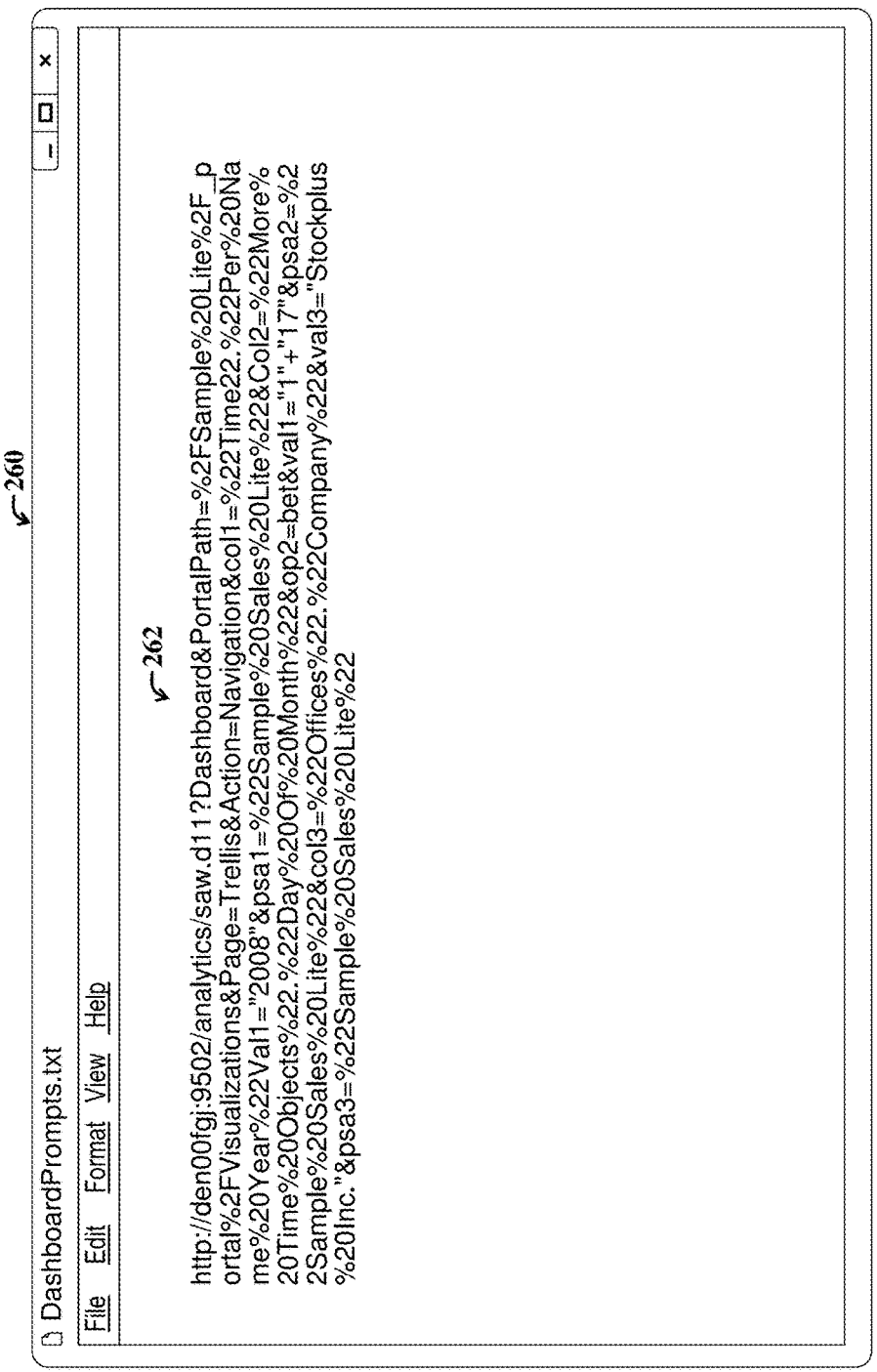
FIG. 7 illustrates a fourth UI display screen showing example content of a text file with parameters captured using the third example UI display screen of FIG. 6.

FIG. 7 illustrates a fourth UI display screen 260 showing example content 262 of a text file with parameters captured using the third example UI display screen 200 of FIG. 6.

The content 262 represents a prompted link. For the purposes of the present discussion, a prompted link may be any text indicating a URL, Uniform Resource Identifier (URI) or other path, along with metadata describing how to construct the UI display screen associated with the URL, URI, or other path.

In summary, dashboard data validation data may be obtained through use of prompted links for particular types of tests, e.g., dashboard comparison tests. Specific testing of dashboards may leverage additional user input for the more relevant validation of the dashboard pages. The parameters are captured from prompted links; a query for dashboard data is constructed; and child pages are extracted within the upgrade verification tool for use in comparison operations.

Figure 8:
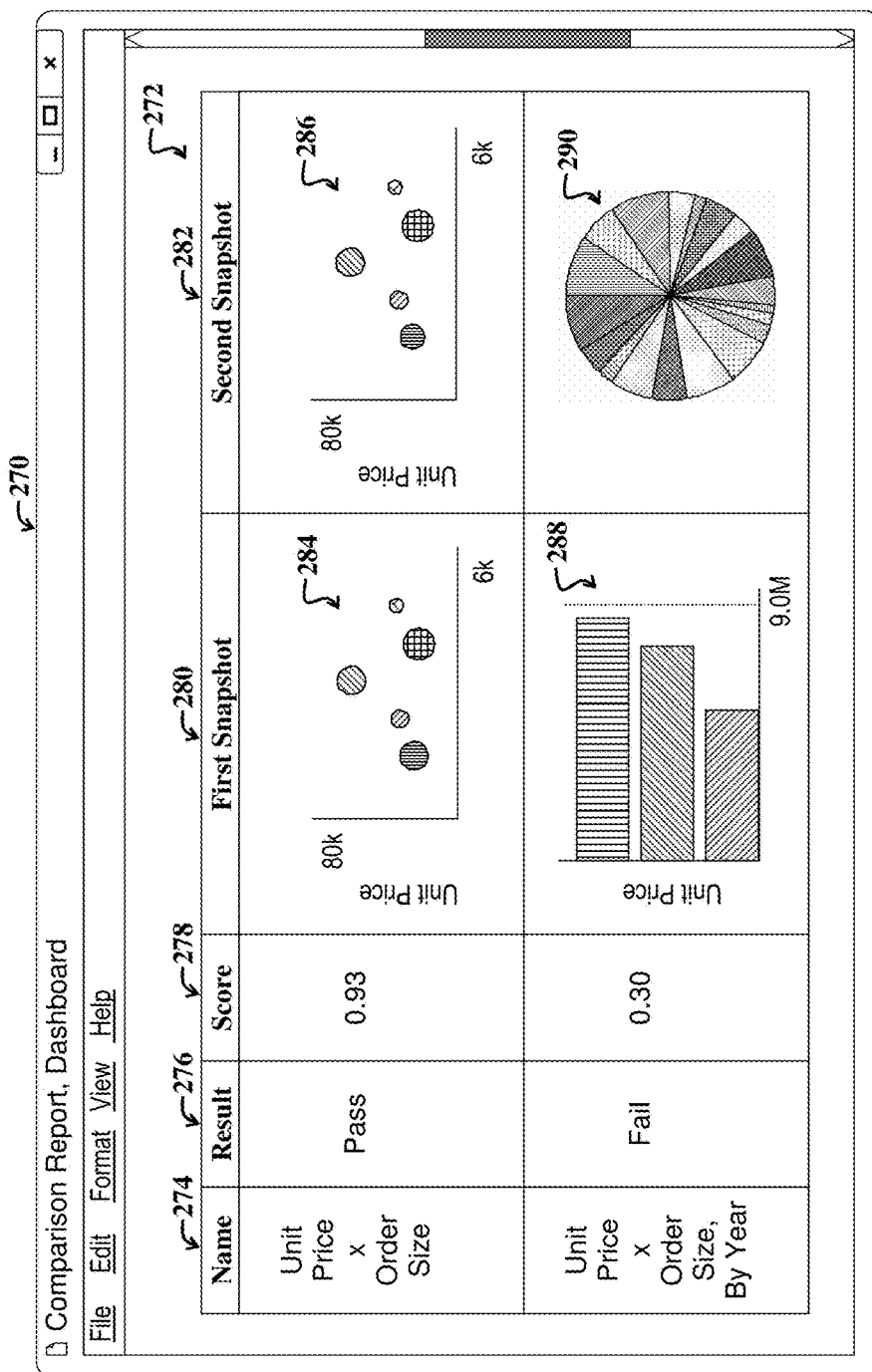
FIG. 8 illustrates a fifth UI display screen, showing example content of a report illustrating results of a comparison operation implemented via the dashboard plugin of the upgrade verification tool of FIGS. 1-2.

FIG. 8 illustrates a fifth UI display screen 270, showing example content of a report illustrating results 272 of a comparison operation implemented via the dashboard plugin 80 and/or UI plugin 80 of the upgrade verification tool 30 of FIG. 2.

The example comparison results 272 include a table with a name column 274, a pass/fail result column 276, a similarity-score column 278, a first snapshot column 280, and a second snapshot column 282. The snapshot columns 280, 282 show representations of a dashboard generated by a pre-upgrade system and a post-upgrade system, respectively.

The names of the dashboards being compared are shown in the name column. If the dashboards in the different columns 280, 282 are sufficiently similar, e.g., image matching suggests that the associated visualizations do not differ by more than a predetermined threshold percentage (e.g., 0.9), then the upgraded visualization (e.g., visualizations 286 or 290) is said to pass, i.e., to be verified and validated.

In the present example embodiment, a second test comparing a first dashboard visualization 288 with a second corresponding upgraded visualization 290 results in the upgraded visualization 290 as not passing the comparison test, as the visualizations 288, 290 are too dissimilar to meet a passing similarity threshold.

Hence, certain embodiments may provide a score based business intelligence report and dashboard visualization validation. With such an approach, the overall look and feel of the reports and dashboards can be readily validated between different releases or versions of the systems. The user can optionally define a threshold used to adjust the sensitivity of the checks on visualization comparisons.

FIG. 9 illustrates a sixth UI display screen 300 showing example content of a report generated based on comparison results output by the catalog plugin 70 of the upgrade verification tool 30 of FIG. 2.

The sixth example UI display screen 300 illustrates report identification information 314 that identifies the report, which software application deployments are being compared, server addresses for the different deployments, and so on.

A results table 302 illustrates comparison results for different catalog objects and associated links. The results table 302 includes a name column 304 indicating catalog object name; a server link column 306 providing a link (e.g., URL) to a particular server hosting the objects and associated links to compare; a result column 308; a first column of file links 310 for a pre-upgrade deployment; and a second column of file links 312 for a post-upgrade deployment.

The links 310, 312 of the pre-upgrade and post-upgrade deployments corresponding to objects or items listed in the name column 304 are shown to have passed the comparison test, as shown in the results column 308.

Figure 10:
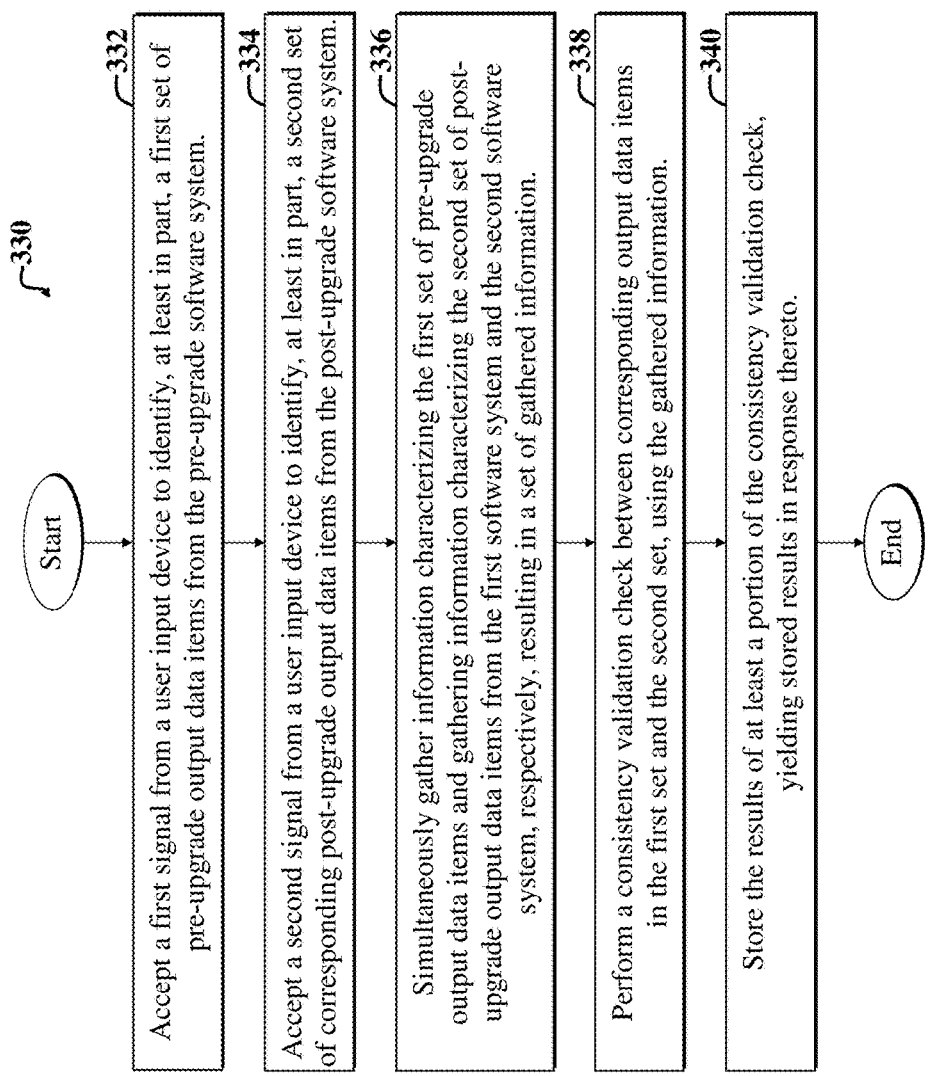
FIG. 10 is a flow diagram of a first example method suitable for use with the embodiments of FIGS. 1-9.

FIG. 10 is a flow diagram of a first example method 330 suitable for use with the embodiments of FIGS. 1-9. The example method 330 facilitates verifying or validating a post-upgrade software system with a pre-upgrade software system.

The third example method 330 includes a first input-accepting step 332, which involves accepting a first signal from a user input device (e.g., a keyboard or other mechanism) to identify (e.g., via a URL), at least in part, a first set of pre-upgrade output data items from the pre-upgrade software system. The output data items may represent, for example, catalog objects of a first presentation catalog.

For the purposes of the present discussion, an output data item may be any computing object (e.g., data object, business object, etc.) with information characterizing an output of or UI display screen content of a software application. Note that output data items, as may be maintained using a presentation catalog, may change depending upon different input or parameters (e.g., prompted-link parameters 262 shown in FIG. 7) fed to a software application (e.g., pre-upgrade and/or post-upgrade software application(s)) so as to have the software application adjust the presentation of data and/or accessible functionality, i.e., content, in accordance with the input and accompanying parameters. An example process of inputting parameters, which then affect output data items (e.g., as represented via visualizations 240, 242 of FIG. 6) is shown in FIG. 5-6.

Note that by simultaneously gathering information from a pre-upgrade software system and a post-upgrade software system, the gathered information may enhance accuracy of the consistency validation check, also called comparison check or regression test herein. In particular, such parallel execution may overcome differences or regressions appearing in output comparison reports that may be attributable primarily to differences in execute times of the plugin discovery phases.

Similarly, a second input-accepting step 334 includes accepting a second signal from a user input device to identify, at least in part, a second set of corresponding post-upgrade output data items from the post-upgrade software system.

Next, an information-gathering step 336 includes near simultaneously gathering information characterizing the first set of pre-upgrade output data items and gathering information characterizing the second set of post-upgrade output data items from the first software system and the second software system, respectively.

Subsequently, a consistency-validation step 338 include using the gathered information to perform a consistency validation check between corresponding output data items in the first set and the second set of output data items, using the gathered information. For the purposes of the present discussion, a consistency validation check may be any test that includes a comparison or juxtaposition of data, interfaces, and/or functionality of different versions of software and/or accompanying hardware or other computing resources used by the different versions of software.

A results-storing step 340 then includes storing the results of at least a portion of the consistency validation check, yielding stored results in response thereto.

Note that the method 330 may be altered, without departing from the scope of the present teachings. For example certain steps may be removed or rearranged, or other steps may be added, or additional detail may be added to or removed from a particular step.

For example, a more detailed version of the method 330 may further specify that the pre-upgrade software system and post-upgrade software system include a pre-upgrade enterprise BI application and a post-upgrade enterprise BI application, respectively. Both of the software applications (pre-upgrade and post-upgrade applications) may both be running during testing, i.e., during implementing the method 330. The first set of pre-upgrade output data items may include objects of a first presentation catalog of the pre-upgrade software application. Similarly, the second set of corresponding post-upgrade output data items may include data objects of a second presentation catalog of the post-upgrade software application.

The example method 330 may further specify that the consistency-validation step 338 further includes analyzing the pre-upgrade data items to produce a first set of test results; analyzing the post-upgrade data items to produce a second test result; and comparing the first set of test results and the second set of test results in accordance with a predetermined comparison test, yielding comparison results.

The consistency-validation step 338 may further include employing one or more plugins to a controller of an upgrade validation tool to implement one or more respective comparison tests to generate the comparison results.

The predetermined test may include, for example, a first test indicated via a control signal received from a user input device. The first test may include a test of one or more user interface display screens (e.g., dashboards) and associated content used for the pre-upgrade software system, and one or more user interface display screens and associated content used for the post-upgrade software system.

The predetermined test may further include a comparison test indicated via the control signal. The comparison test may include collecting information that indicates differences between the first set of test results and the second set of test results.

The control signal may include a signal generated from a command line entry (e.g., as specified via command line statements and arguments), the command line entry indicating one or more tests to perform as part of the consistency validation check. The control signal may further include information indicating one or more tests to perform using one or more plugins to a plugin controller.

The consistency-validation step 338 may further include includes loading one or more test components, resulting in one or more loaded test components, e.g., one or more software plugins that plug into a controller (e.g., controller 32 of FIG. 2) of an upgrade verification tool (e.g., the tool 30 of FIG. 2).

The first input-accepting step 332 may further include receiving, at the controller, information characterizing the first set of pre-upgrade output data items as maintained in a configuration file. Similarly, the second input-accepting step 334 may further include receiving, at the controller, information characterizing the second set of post-upgrade data items as maintained in the configuration file.

The example method 330 may further include receiving a third signal at the controller, wherein the third signal represent a command to begin performing one or more consistency validation checks using on the pre-upgrade data items and the post-upgrade data items.

The controller may accept a fourth signal from a user input device allow a user to choose from one or more predetermined sets of tests. This may be provided via one or more commands that may be specified via command line statements and/or arguments. Alternatively, or in addition, the control signals are derived from user interactions with a GUI built for the upgrade verification tool (e.g., software 30 of FIG. 2).

The one or more plugins may include a first plugin (e.g., report plugin) for generating a report score for a report; and using the score to perform the consistency validation check between corresponding output data items in the first and second sets.

A dashboard plugin may generate a dashboard score for a dashboard visualization. The dashboard plugin may use the score and a comparer module or function to perform the consistency validation check between corresponding output data items in the first and second sets.

Another plugin may accept a signal from a user input device to allow a user to define a threshold which is used to adjust the sensitivity of at least one parameter of the validation check The first example method 330 may further include accepting a prompted link definition; and using the prompted link to perform, at least in part, a validation check of a user interface dashboard. Another plugin may compare one or more data objects of the pre-upgrade software application and one or more data objects of the post-upgrade software application in accordance with user-specified software code, i.e., custom code included in the fourth plugin, e.g., custom plugin.

Figure 11:
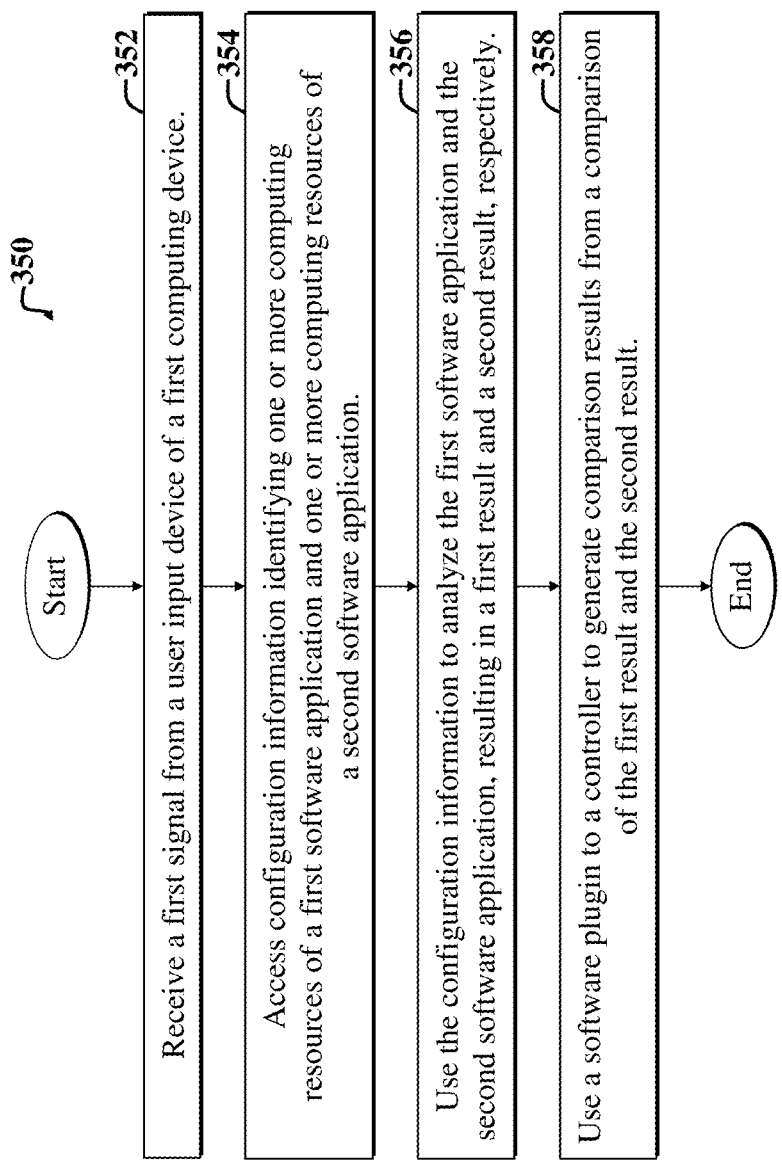
FIG. 11 is a flow diagram of a second example method suitable for use with the embodiments of FIGS. 1-10.

FIG. 11 is a flow diagram of a second example method 350 suitable for use with the embodiments of FIGS. 1-10. The second example method 330 facilitates comparing networked software applications and/or data, features, and content thereof.

The second example method 330 includes an initial user-input step 332, which involves receiving a first signal from a user input device of a first computing device.

Similarly, a second user-input step 334 includes accessing configuration information identifying one or more computing resources (e.g., a pre-upgrade presentation catalog and/or objects thereof) of a first software application and one or more computing resources (e.g., post-upgrade presentation catalog and/or objects thereof) of a second software application.

Next, a configuration step 356 includes using the configuration information to analyze the first software application and the second software application, resulting in a first result and a second result, respectively.

Lastly, a plugin-using step 358 includes generating comparison results, using a software plugin to a controller, from a comparison of the first result and the second result.

Note that use of plugins, as discussed herein, to facilitate modularizing functionality of an upgrade verification tool, may yield substantial benefits, such as relatively small and easily managed test areas; clear definitions of system architecture; extensible framework capabilities; enhanced control over upgrade verification tool consistency; improved memory resource usage, and so on.

The second example method 350 may be altered, without departing from the scope of the present teachings. For example, the configuration step 356 may further specify that use of the configuration information further includes automatically activating a browser to navigate to a first network address associated with the first software application to facilitate collecting information to generate the first result; and automatically using the browser to navigate to a second network address associated with the second software application to facilitate collecting information to generate the second result.

Comparison results may be saved as a report document (e.g., XML, HTML, CSV file, etc.). The configuration information may be maintained in one or more configuration files (e.g., the files 62, 64 of FIG. 2).

The one or more computing resources of the first software application (i.e., pre-upgrade software application) may include a first catalog file (e.g., presentation catalog and/or particular object thereof). Similarly, the one or more computing resources of the second software application may include a second catalog file. The first catalog file may represent a first presentation catalog of a first Business Intelligence (BI) software application, while the second catalog file represents a presentation catalog of a second BI software application. The second BI software application may represent an upgraded or otherwise modified version of the first BI software application. The first BI software application and the second BI software application may be cloud-based applications accessible to the first computing device via a network.

The example plugins step 358 may further specify employing a first plugin to a controller and second plugin to the controller to conduct a first test and a second test, respectively, on both a first computing resource of the first software application, and on a second computing resource of the second software application, respectively. The second computing resource may represent an upgraded version of the first computing resource, wherein the first computing resource and the second computing resource include a first presentation catalog and a second presentation catalog, respectively. Comparison results may be generated based on a matching of the first presentation catalog and the second presentation catalog.

The second example method 350 may further specify that the first test includes providing one or more parameters to the first software application, which may represent networked BI software applications. The example method 350 may further include generating a first intermediate test result based on the one or more parameters and an output of the first software application, in response to the inputting of the one or more parameters to the first software application. A second intermediate result may be generated based an output of the second software application in response to the inputting of the one or more parameters to the second software application.

The second example method 350 may further include, near simultaneously, initiating the first test and the second test, resulting in approximate simultaneous generation of the first intermediate result and the second intermediate result, respectively.

Generation of the comparison results may further include comparing items of the first presentation catalog and items of the second presentation catalog to generate a score indicating a degree of match between the first presentation catalog and the second presentation catalog. Examples of plugins that may be used to perform different types of regression tests include a catalog plugin, report plugin, UI plugin, etc.

Figure 12:
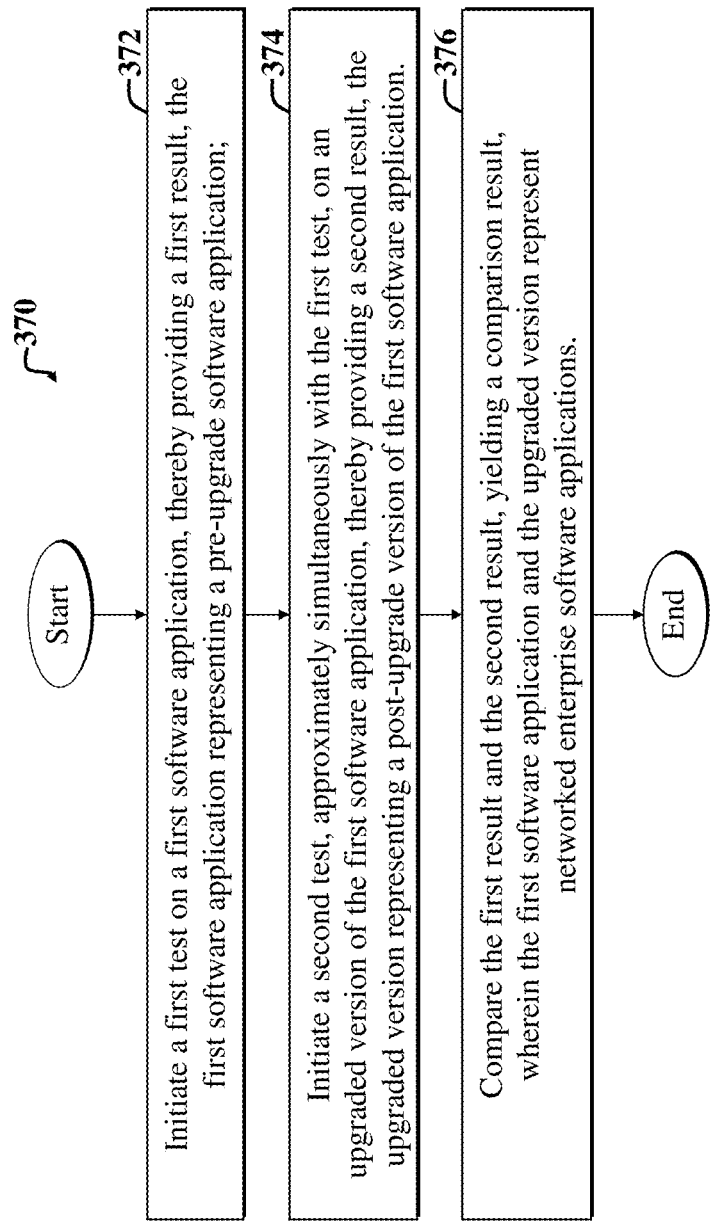
FIG. 12 is a flow diagram of a third example method suitable for use with the embodiments of FIGS. 1-11.

FIG. 12 is a flow diagram of a third example method 370 suitable for use with the embodiments of FIGS. 1-11. The third example method facilitates performing regression testing on versions of software applications.

The third example method 370 includes a first step 372, which involves initiating a first test on a first software application, thereby providing a first result. The first software application represents a pre-upgrade software application.

A second step 374 includes initiating a second test, near simultaneously with the first test, on an upgraded version of the first software application, thereby providing a second result. The upgraded version represents a post-upgrade version of the first software application.

Lastly, a third step 376 includes comparing the first result and the second result, yielding a comparison result.

Note that the method 370 may be altered, without departing from the scope of the present teachings. For example, the method 370 may further specify that the first software application and the upgraded version represent networked enterprise software applications.

The third example method 370 may further include receiving a first signal from a user input device at a controller, wherein the controller in communication with a first plugin. The first plugin may include computer code for implementing the first test and the second test in response to a second signal received by the first plugin from the controller in response to receipt of the first signal by the controller.

The first signal may include information from a command line and one or more command line arguments specifying or otherwise directing the controller to facilitate implementing the first test and the second test.

The third example method 370 may further specify using the first plugin to: access information from a configuration file to identify a first network address associated with the first software application and a second network address associated with the upgraded version; and to automatically activate a web browser on a client computing device to access one or more presentation catalogs at the first network address and at the second network address.

The browser may be used to generate a first prompted link (e.g., as shown in FIG. 6). The prompted link characterizes one or more user interface display screens of the first software application. Similarly, a second prompted link characterizes one or more user interface display screens of the second software application.

The third example method 370 may further include maintaining information included in the first prompted link and the second prompted link in the configuration file; and using the configuration file to generate one or more computing objects usable by the first plugin to generate the first result and the second result. The one or more presentation catalogs may include a first presentation catalog and a second presentation catalog of the first software application and the upgraded version, respectively.

The third example method 370 may further include receiving a signal, at the first plugin, from the controller; the signal directing the first plugin to compare one or more computing objects of the first presentation catalog with one or more computing objects of the second presentation catalog, thereby generating the comparison result.

A degree of match between one between one or more objects of the first presentation catalog and one or more objects of the second presentation catalog may be calculated. Calculation or determination of the degree of match may further involve scoring a similarity between a first computing object of the first presentation catalog and a second computing object of the second presentation catalog, yielding a similarity score; and comparing the similarity score with a threshold to determine whether a feature of the first software application is sufficiently different that a respective feature of the upgraded version to cause a feature associated with the second object.

The first test and the second test may be similar tests that are applied to the first software application and the upgraded version via a specialized plugin configured to test a predetermined aspect of the first software application and the second software application. The specialized plugin is implemented via a Plugin Framework.

The specialized plugin include or represent a catalog plugin, and wherein the predetermined aspect includes presentation catalogs of the first software application and the upgraded version.

Similarly, the specialized plugin may include or represent a security plugin, and wherein the predetermined aspect includes information about users and permissions associated with the users that affect user access to one or more computing objects of a first presentation catalog of the first software application and a second presentation catalog of the upgraded version.

Similarly, the specialized plugin may include or represent a UI plugin and/or dashboard plugin, and wherein the predetermined aspect includes an appearance of a first user interface display screen dashboard of the first software application with a second user interface display screen dashboard of the upgraded version.

The first software application and the upgraded version may include or represent networked BI software. The networked BI software may run on a server accessible to the specialized plugin via a browser of a client device used to receive user input. The user input may include a command to direct a controller, which communicates with one or more specialized plugins, to initiate one or more tests of the first software application and the upgraded version in accordance with one or more arguments of the command.

The third example method 370 may further include providing a user option to adjust a sensitivity threshold used in the step 376 of comparing, so as to generate the comparison result indicating a pass/fail score for a particular comparison. A special report plugin (and or compare module of each plugin) may combine test results provided by one or more additional plugins into a report containing the comparison result.

Although the description has been described with respect to particular embodiments thereof, these particular embodiments are merely illustrative, and not restrictive. For example, although specific embodiments have been shown implemented as plug-ins or other mechanisms it is possible to provide similar or equivalent functionality using other software techniques or approaches. Furthermore, while various embodiments discuss comparing presentation catalogs of networked enterprise software applications, embodiments are not limited thereto. For example, versions of embodiments discussed herein may be employed to test client-side software running on a desktop computer (and not necessarily distributed over a network), without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for verifying a post-upgrade software system with a pre-upgrade software system, the method comprising:
   accepting a first signal from a user input device to identify, at least in part, a first set of pre-upgrade output data items from the pre-upgrade software system;
   accepting a second signal from the user input device to identify, at least in part, a second set of corresponding post-upgrade output data items from the post-upgrade software system;
   receiving a third signal from the user input device based on selection of a run-parallel tests option, wherein the first, second, and third signals are generated based on user input received from one or more user interface (UI) display screens;
   in response to the third signal, scheduling nearly simultaneously a first gathering of information and a second gathering of information, wherein
   the first gathering of information characterizes the first set of pre-upgrade output data items from the pre-upgrade software system;

the second gathering of information characterizes the second set of corresponding post-upgrade output data items from the post-upgrade software system, wherein the first and second gathering results in a set of gathered information, wherein the first gathering of information and the second gathering of information are performed nearly simultaneously to minimize variations resulting from changing underlying data;

performing a consistency validation check between corresponding output data items in the first set and the second set, using the gathered information, wherein at least a portion of the first set and the second set include catalog information;

storing results of at least a portion of the consistency validation check, yielding stored results in response thereto; and in response to a selection of a UI control of the one or more UI display screens, displaying at least a portion of the results via the one or more UI display screens.

2. The method of claim 1, wherein the pre-upgrade software system includes a pre-upgrade software application, and wherein the post-upgrade software system includes a post-upgrade software application, the pre-upgrade software application and the post-upgrade software application both running simultaneously during the performing of the consistency validation check.

3. The method of claim 2, wherein the pre-upgrade software application and the post-upgrade software application include networked enterprise software applications, and wherein the networked enterprise software applications include Business Intelligence (BI) software applications, and wherein the first set of pre-upgrade output data items includes data objects of a first presentation catalog of the pre-upgrade software application, and wherein the second set of corresponding post-upgrade output data items includes data objects of a second presentation catalog of the post-upgrade software application.

4. The method of claim 1, wherein the performing of the consistency validation check further includes:
analyzing the pre-upgrade output data items to produce a first set of test results;
analyzing the post-upgrade output data items to produce a second set of test result; and
comparing the first set of test results and the second set of test results in accordance with a predetermined comparison test, yielding comparison results.

5. The method of claim 4, wherein the analyzing of the post-upgrade output data items includes analyzing the post-upgrade items with analyzing the pre-upgrade output data items, and wherein the performing of the consistency validation check includes: employing one or more plugins to a controller of an upgrade validation tool to implement one or more respective comparison tests to generate the comparison results.

6. The method of claim 4, wherein the predetermined comparison test includes a first test indicated via a control signal received from the user input device.

7. The method of claim 6, wherein the first test includes a test of one or more user interface display screens and associated content used for the pre-upgrade software system, and the one or more user interface display screens and associated content used for the post-upgrade software system.

8. The method of claim 6, wherein the predetermined test further includes a comparison test indicated via the control signal, wherein the comparison test includes collecting information that indicates one or more differences between the first set of test results and the second set of test results.

9. The method of claim 6, wherein the control signal includes a signal generated from a command line entry, the command line entry indicating one or more tests to perform as part of the consistency validation check.

10. The method of claim 6, wherein the control signal includes information indicating one or more tests to perform using one or more plugins to a plugin controller.

11. The method of claim 1, wherein the performing of the consistency validation check further includes loading one or more test components, resulting in one or more loaded test components, wherein the one or more loaded test components include one or more software plugins, the one or more software plugins plugging into a controller of an upgrade verification tool.

12. The method of claim 11, wherein the accepting of the first signal further includes:
receiving, at the controller, information characterizing the first set of pre-upgrade output data items as maintained in a configuration file; and
receiving, at the controller, information characterizing the second set of corresponding post-upgrade output data items as maintained in the configuration file.

13. The method of claim 12, further including:
receiving a fourth signal at the controller, the fourth signal representing a command to begin performing one or more consistency validation checks using on the pre-upgrade output data items and the post-upgrade output data items.

14. The method of claim 11, further including:
using the controller to accept a fifth signal from a user input device to allow a user to choose from one or more predetermined sets of tests.

15. The method of claim 14, wherein the one or more software plugins include a first plugin for:
generating a report score for a report; and
using the score to perform the consistency validation check between corresponding output data items in the first and second sets.

16. The method of claim 14, wherein the one or more software plugins include a second plugin for:
generating a dashboard score for a dashboard visualization; and
using the score to perform the consistency validation check between corresponding output data items in the first and second sets.

17. The method of claim 14, wherein the one or more software plugins include a third plugin for:
accepting a signal from the user input device to allow a user to define a threshold which is used to adjust sensitivity of at least one parameter of the validation check.

18. The method of claim 14, further including:
accepting a prompted link definition; and
using the prompted link to perform, at least in part, a validation check of a user interface dashboard.

19. An apparatus for implementing a computer user interface for verifying a post-upgrade software system with a pre-upgrade software system, the apparatus comprising:
one or more digital processors;
one or more tangible storage media including instructions executable by the one or more digital processors for:
accepting a first signal from a user input device to identify, at least in part, a first set of pre-upgrade output data items from the pre-upgrade software system;

accepting a second signal from the user input device to identify, at least in part, a second set of corresponding post-upgrade output data items from the post-upgrade software system;

receiving a third signal from the user input device based on selection of a run-parallel tests option, wherein the first, second, and third signals are generated based on user input received from one or more user interface (UI) display screens;

in response to the third signal, scheduling nearly simultaneously a first gathering of information and a second gathering of information, wherein the first gathering of information characterizes the first set of pre-upgrade output data items from the pre-upgrade software system;

the second gathering of information characterizes the second set of corresponding post-upgrade output data items from the post-upgrade software system, wherein the first and second gathering results in a set of gathered information, wherein the first gathering of information and the second gathering of information are performed nearly simultaneously to minimize variations resulting from changing underlying data;

performing a consistency validation check between corresponding output data items in the first set and the second set, using the gathered information, wherein at least a portion of the first set and the second set include catalog information;

storing results of at least a portion of the consistency validation check, yielding stored results in response thereto; and in response to a selection of a UI control of the one or more UI display screens, displaying at least a portion of the results via the one or more UI display screens.

20. One or more non-transitory storage media including instructions executable by one or more processors for implementing a computer user interface for verifying a post-upgrade software system with a pre-upgrade software system, the one or more tangible storage media comprising instructions for:

accepting a first signal from a user input device to identify, at least in part, a first set of pre-upgrade output data items from the pre-upgrade software system;

accepting a second signal from the user input device to identify, at least in part, a second set of corresponding post-upgrade output data items from the post-upgrade software system;

receiving a third signal from the user input device based on selection of a run-parallel tests option, wherein the first, second, and third signals are generated based on user input received from one or more user interface (UI) display screens;

in response to the third signal, scheduling nearly simultaneously a first gathering of information and a second gathering of information, wherein the first gathering of information characterizes the first set of pre-upgrade output data items from the pre-upgrade software system;

the second gathering of information characterizes the second set of corresponding post-upgrade output data items from the post-upgrade software system, wherein the first and second gathering results in a set of gathered information, wherein the first gathering of information and the second gathering of information are performed nearly simultaneously to minimize variations resulting from changing underlying data;

performing a consistency validation check between corresponding output data items in the first set and the second set, using the gathered information, wherein at least a portion of the first set and the second set include catalog information;

storing results of at least a portion of the consistency validation check, yielding stored results in response thereto; and in response to a selection of a UI control of the one or more UI display screens, displaying at least a portion of the results via the one or more UI display screens.

\* \* \* \* \*

UNITED STATES PATENT AND TRADEMARK OFFICE
CERTIFICATE OF CORRECTION

| | | |
|---|---|---|
| PATENT NO. | : 10,228,932 B2 | Page 1 of 1 |
| APPLICATION NO. | : 15/167961 | |
| DATED | : March 12, 2019 | |
| INVENTOR(S) | : Ozdemir et al. | |

It is certified that error appears in the above-identified patent and that said Letters Patent is hereby corrected as shown below:

In the Drawings

On sheet 2 of 12, in FIG. 2, under Reference Numeral 62, Line 4, delete "etc." and insert -- etc.) --, therefor.

In the Specification

In Column 11, Lines 14-15, delete "DashboardPrompts.text" and insert -- DashboardPrompts.txt --, therefor.

In Column 14, Line 37, delete "conFIG.xml" and insert -- config.xml --, therefor.

In Column 14, Line 55, delete "and or" and insert -- and/or --, therefor.

In Column 19, Line 58, delete "[ ]))" and insert -- [ ]) --, therefor.

In Column 28, Line 37, delete "FIG. 5-6." and insert -- FIGS. 5-6. --, therefor.

In Column 30, Line 24, delete "check" and insert -- check. --, therefor.

Signed and Sealed this
Third Day of March, 2020

Andrei Iancu
*Director of the United States Patent and Trademark Office*